US012623902B2

(12) United States Patent
Xiao et al.

(10) Patent No.: US 12,623,902 B2
(45) Date of Patent: May 12, 2026

(54) PROCESS FOR PRODUCING HYDROGEN

(71) Applicant: Oxford University Innovation Limited, Oxford (GB)

(72) Inventors: Tiancun Xiao, Oxford (GB); Peter P. Edwards, Oxford (GB); Xiangyu Jie, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 1767 days.

(21) Appl. No.: 16/466,334

(22) PCT Filed: Dec. 4, 2017

(86) PCT No.: PCT/GB2017/053645
§ 371 (c)(1),
(2) Date: Jun. 4, 2019

(87) PCT Pub. No.: WO2018/104712
PCT Pub. Date: Jun. 14, 2018

(65) Prior Publication Data
US 2024/0228273 A1 Jul. 11, 2024

(30) Foreign Application Priority Data
Dec. 5, 2016 (GB) ..................................... 1620667

(51) Int. Cl.
*C01B 3/26* (2006.01)

(52) U.S. Cl.
CPC ........ *C01B 3/26* (2013.01); *C01B 2203/0277* (2013.01); *C01B 2203/0855* (2013.01); *C01B 2203/1058* (2013.01); *C01B 2203/1082* (2013.01); *C01B 2203/1247* (2013.01)

(58) Field of Classification Search
None
See application file for complete search history.

(56) References Cited

U.S. PATENT DOCUMENTS

| | | | |
|---|---|---|---|
| 7,022,306 B1 | 4/2006 | Oroskar et al. | |
| 2004/0005270 A1 | 1/2004 | Xu et al. | |
| 2015/0246342 A1* | 9/2015 | Nagashima | C01B 3/40 |
| | | | 502/328 |

FOREIGN PATENT DOCUMENTS

| | | | |
|---|---|---|---|
| CN | 1351953 | * | 6/2002 |
| CN | 1729139 A | | 2/2006 |
| CN | 1762790 A | | 4/2006 |
| CN | 101314128 A | | 12/2008 |
| CN | 102408309 | * | 4/2012 |
| CN | 102974362 | * | 3/2013 |
| CN | 204643832 | * | 9/2015 |
| JP | 2004089812 | * | 3/2004 |

| | | | | |
|---|---|---|---|---|
| JP | 2004 319333 A | | 11/2004 | |
| JP | 2004319333 | * | 11/2004 | |
| JP | 2015 020929 A | | 2/2015 | |
| RU | 2423176 C2 | | 7/2011 | |
| WO | 2003/045841 A1 | | 6/2003 | |
| WO | 2012/013940 A2 | | 2/2012 | |
| WO | 2016203264 | * | 12/2016 | |
| WO | WO-2016203264 A1 | * | 12/2016 | ............ B01J 19/126 |

OTHER PUBLICATIONS

Study.com "Petrodiesel & Biodiesel: Properties & Comparisons". 2024. (Year: 2024).*
Novin Trades. Kerosene Molecular Formula. https://www.novintrades. com/articles/454 Nov. 11, 2023 (Year: 2023).*
Curi et al. "Chemical and Physical Properties of refined Petroleum products". NOAA Technical Memo. 1997 (Year: 1997).*
UK Search Report for GB1620667.4, dated May 31, 2017, pp. 1-4.
International Search Report and Written Opinion for PCT/GB2017/ 053645, dated Mar. 8, 2018 pp. 1-10.
International Preliminary Report on Patentability for PCT/GB2017/ 053645, dated Jun. 11, 2019 pp. 1-7.
S. Gonzalez-Cortes et al: "Wax: A benign hydrogen-storage material that rapidly releases H2-rich gases through microwave-assisted catalytic decomposition", Scientific Reports, vol. 6, No. 35315, Oct. 19, 2016 (Oct. 19, 2016), pp. 1-11.
Kiangyu Jie et al: "Rapid Production of High-Purity Hydrogen Fuel through Microwave-Promoted Deep Catalytic Dehydrogenation of Liquid Alkanes with Abundant Metals", Angewandte Chemie, vol. 129, No. 34, May 23, 2017 (May 23, 2017), pp. 10304-10307.
Scientific Reports, vol. 6, No. 35315, Oct. 19, 2016, S Gonzalez-27 and Cortes et al., "Wax: A benign hydrogen-storage material that rapidly releases H2-rich gases through microwave-assisted catalytic decomposition". See especially the first paragraph of p. 8 and the experimental section on p. 9.
P. P. Edwards, V. L. Kuznetsov, W. I. F. David, N. P. Brandon, Hydrogen and fuel cells: Towards a sustainable energy future. Energy Policy 36, 4356-4362 (2008).

(Continued)

*Primary Examiner* — Sheng H Davis
(74) *Attorney, Agent, or Firm* — Thomas|Horstemeyer, LLP

(57) ABSTRACT

The present invention provides a process for producing hydrogen comprising exposing a liquid composition comprising a hydrocarbon to electromagnetic radiation in the presence of a solid catalyst, wherein the catalyst comprises: at least one metal species, comprising one or more elements selected from Fe, Ni and Co; and a non-oxygenated ceramic. Also provided are a heterogeneous mixture comprising a solid catalyst in intimate mixture with a liquid composition comprising a hydrocarbon wherein the catalyst comprises: at least one metal species comprising Fe and/or Ni; and a non-oxygenated ceramic. Also provided are the use of said mixture to produce hydrogen, a microwave reactor comprising said mixture and a vehicle comprising said reactor. Furthermore, the invention provides a fuel cell module comprising a (i) a fuel cell and (ii) a heterogeneous mixture as described herein, and a vehicle or electronic device comprising said fuel cell module.

14 Claims, 19 Drawing Sheets

(56) References Cited

OTHER PUBLICATIONS

D. P. Gregory, D. Y. C. Ng, G. M. Long, The hydrogen economy. Electrochem. Cleaner Environ., 226-280 (1972).

J. A. Turner, Sustainable Hydrogen Production. Science (Washington, DC, U. S.) 305, 972-974 (2004).

M. Ni, M. K. H. Leung, D. Y. C. Leung, K. Sumathy, A review and recent developments in photocatalytic water-splitting using for hydrogen production. Renewable and Sustainable Energy Reviews 11, 401-425 (2007).

J. Turner et al., Renewable hydrogen production. Int. J. Energy Res. 32, 379-407 (2008).

L. Schlapbach, A. Zuettel, Hydrogen-storage materials for mobile applications. Nature (London, U. K.) 414, 353-358 (2001).

M. L. Wald, Questions about a hydrogen economy. Sci. Am. 290, 66-73 (2004).

B. Sakintuna, F. Lamari-Darkrim, M. Hirscher, Metal hydride materials for solid hydrogen storage: A review. International Journal of Hydrogen Energy 32, 1121-1140 (2007).

Z. Xiong et al., High-capacity hydrogen storage in lithium and sodium amidoboranes. Nat Mater 7, 138-141 (2008).

W. Grochala, P. P. Edwards, Thermal Decomposition of the Non-Interstitial Hydrides for the Storage and Production of Hydrogen. Chem. Rev. (Washington, DC, U. S.) 104, 1283-1315 (2004).

F. A. Armstrong, J. C. Fontecilla-Camps, A Natural Choice for Activating Hydrogen. Science (Washington, DC, U. S.) 322, 529 (2008).

A. Boddien et al., Efficient Dehydrogenation of Formic Acid Using an Iron Catalyst. Science (Washington, DC, U. S.) 333, 1733-1736 (2011).

M. Wang, L. Sun, Hydrogen Production by Noble-Metal-Free Molecular Catalysts and Related Nanomaterials. ChemSusChem 3, 551-554 (2010).

R. M. Navarro, M. A. Pena, J. L. G. Fierro, Hydrogen Production Reactions from Carbon Feedstocks: Fossil Fuels and Biomass. Chem. Rev. (Washington, DC, U. S.) 107, 3952-3991 (2007).

R. J. Pearson et al., Energy storage via carbon-neutral fuels made from CO2, water, and renewable energy. Proc. IEEE 100, 440-460 (2012).

Materials Science Forum, vol. 658, 2010, Y Hawangchu et al., "Effect of silicon carbide susceptor and nickel catalyst content on microwave enhanced thermal conversion of glycerol waste", pp. 73-76.

Amendment to UK Search Report for GB1620667.4, dated Nov. 24, 2017, pp. 1-3.

Chinese Office Action for Application No. 201780082474.7, dated Apr. 27, 2022, pp. 1-21 (Translation Included).

* cited by examiner

Electric motor

Final Energy Output

Fuel cell $H_2$

Carbon

Liquid hydrocarbons: Diesel etc.

Microwave Reactor

PROCESS FOR PRODUCING HYDROGEN

CROSS-REFERENCE TO RELATED APPLICATIONS

This application is the National Stage of International Application No. PCT/GB2017/053645, filed Dec. 4, 2017, which claims the priority to GB 1620667.4, filed Dec. 5, 2016, which are entirely incorporated herein by reference.

INTRODUCTION

The present invention relates to a process for producing hydrogen from fossil fuels. In particular, the process of the present invention provides a catalytic process for the decomposition of hydrocarbons to provide high purity hydrogen gas, suitably with minimal carbon by-products (such as $CO_2$, CO and small hydrocarbons).

BACKGROUND OF THE INVENTION

Today, the world's ever-increasing energy demand is still based almost exclusively on fossil fuels, not only because of their unrivalled energy-carrying properties but also because of the demands of the world-wide energy infrastructure which has developed over the past century.

Hydrogen is regarded as one of the key energy solutions for the future (1-5), not only because of its intensive energy density per unit-mass, but also because its combustion produces no environmentally harmful carbon dioxide. Hence the problem of capturing this by-product is circumvented (1-5).

However, the cost of hydrogen production, delivery, and storage systems is the major barrier that hinders the development of hydrogen-based economy (1, 6-12). The most efficient and widely used process so far for the production of hydrogen in industry is based on fossil fuel, for example by steam reforming or partial oxidation of methane and to a lesser degree by gasification of coal (3, 12-14). However, like combustion of hydrocarbons, all these conventional options of hydrogen production from hydrocarbons involve $CO_2$ production, which is environmentally undesirable. Therefore, technologies like Carbon Capture and Storage (CCS) and Carbon Capture and Utilization (CCU) are needed to control the $CO_2$ level (1,15).

Solar energy can be used to yield increasing amounts of hydrogen by the splitting of water, but even if the photocatalytic or electrolytic breakdown of water could be greatly improved to produce large quantities of $H_2$, the question of its safe storage and rapid release for immediate use in applications such as fuel cells, for example, would still be problematic (1, 12).

There is a need for an in-situ process for the rapid release of high purity hydrogen from a suitable hydrogen containing material without the generation of environmentally harmful carbon dioxide. Such technologies would accelerate the introduction of widespread use of hydrogen powered vehicles for instance, thus reducing pollution and aiding the environment.

A recent development has seen the use of wax as a benign-hydrogen storage material to rapidly release hydrogen-rich gases through a microwave assisted catalytic decomposition (16).

The present invention seeks to provide a simple and compact technology for in-situ hydrogen generation from a suitable hydrogen containing material. The present invention aims to provide high purity hydrogen with minimal production of carbon dioxide.

SUMMARY OF THE INVENTION

The present invention provides a simple and compact process for the production of hydrogen from liquid hydrocarbons using the assistance of electromagnetic radiation. This allows the production of highly pure hydrogen with minimal carbon by-products (such as $CO_2$, CO and small hydrocarbons).

This technology has particular application to in situ hydrogen generation, in particular on board hydrogen generation.

Accordingly, in a first aspect the present invention provides a process for producing hydrogen comprising exposing a liquid composition comprising a hydrocarbon to electromagnetic radiation in the presence of a solid catalyst, wherein the catalyst comprises:

at least one metal species, comprising one or more elements selected from Fe, Ni and Co; and
  a non-oxygenated ceramic.

In a second aspect, the present invention provides a heterogeneous mixture comprising a solid catalyst in intimate mixture with a liquid composition comprising a hydrocarbon wherein the catalyst comprises:

at least one metal species, comprising one or more elements selected from Fe, Ni and Co; and
  a non-oxygenated ceramic.

In a third aspect, the present invention provides the use of a heterogeneous mixture of the second aspect for generating hydrogen.

In a fourth aspect, the present invention provides a microwave reactor comprising a heterogeneous mixture, said mixture comprising a solid catalyst in intimate mixture with a liquid composition comprising a hydrocarbon wherein the catalyst comprises:

at least one metal species, comprising one or more elements selected from Fe, Ni and Co; and
  a non-oxygenated ceramic.

In a fifth aspect, the present invention provides a vehicle comprising a microwave reactor according to the fourth aspect.

In a sixth aspect, the present invention provides a fuel cell module comprising (i) a fuel cell and (ii) a heterogeneous mixture comprising a solid catalyst in intimate mixture with a liquid composition comprising a hydrocarbon wherein the catalyst comprises:

at least one metal species, comprising one or more elements selected from Fe, Ni and Co; and
  a non-oxygenated ceramic.

In a seventh aspect, the present invention provides a vehicle or an electronic device comprising a fuel cell module according to the sixth aspect.

Preferred, suitable, and optional features of any one particular aspect of the present invention are also preferred, suitable, and optional features of any other aspect.

DETAILED DESCRIPTION OF THE INVENTION

Definitions

Figure 1:
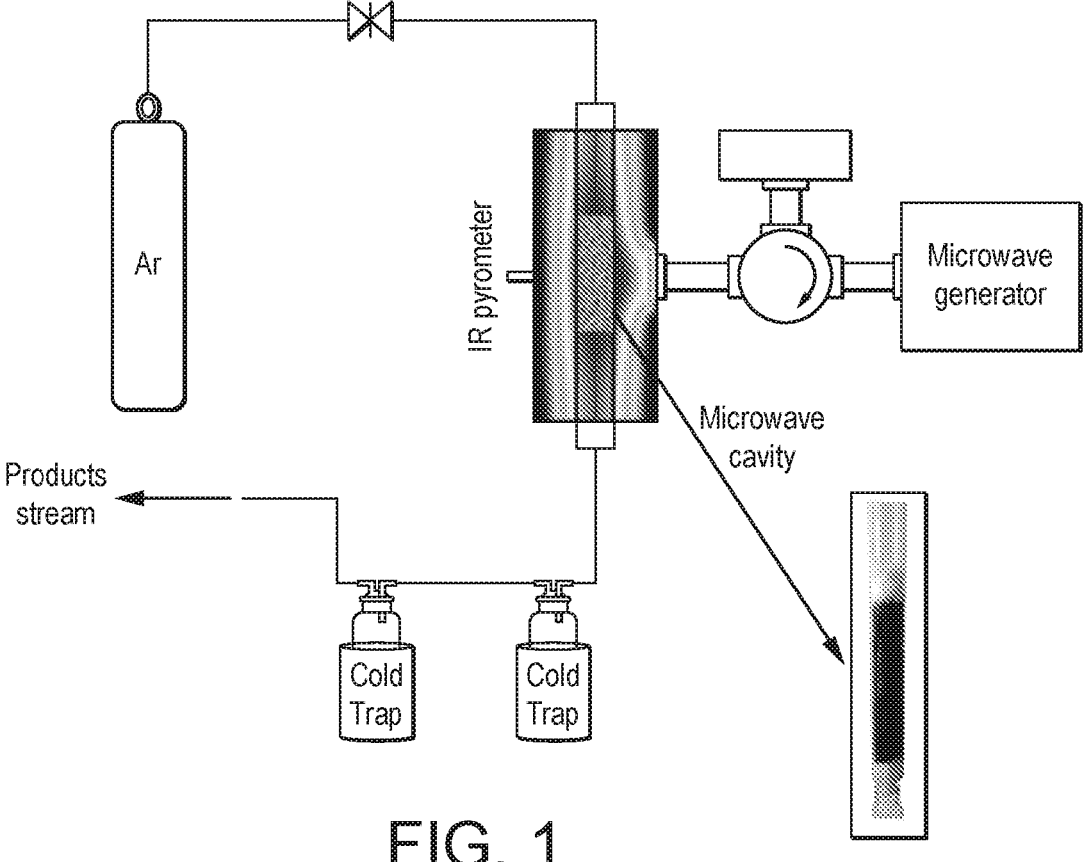
FIG. 1 shows the reaction system configuration used for dehydrogenation of liquid hydrocarbons using microwave radiation.

As used herein the term "liquid composition" refers to a composition which is liquid at standard ambient temperature and pressure (SATP), i.e. at a temperature of 298.15 K (25° C.) and at 100,000 Pa (1 bar, 14.5 psi, 0.9869 atm).

As used herein the term "hydrocarbon" refers to organic compounds consisting of carbon and hydrogen.

For the avoidance of doubt, hydrocarbons include straight-chained and branched, saturated and unsaturated aliphatic hydrocarbon compounds, including alkanes, alkenes, and alkynes, as well as saturated and unsaturated cyclic aliphatic hydrocarbon compounds, including cycloalkanes, cycloalkenes and cycloalkynes, as well as hydrocarbon polymers, for instance polyolefins.

Hydrocarbons also include aromatic hydrocarbons, i.e. hydrocarbons comprising one or more aromatic rings. The aromatic rings may be monocyclic or polycyclic.

Aliphatic hydrocarbons which are substituted with one or more aromatic hydrocarbons, and aromatic hydrocarbons which are substituted with one or more aliphatic hydrocarbons, are also of course encompassed by the term "hydrocarbon" (such compounds consisting only of carbon and hydrogen) as are straight-chained or branched aliphatic hydrocarbons that are substituted with one or more cyclic aliphatic hydrocarbons, and cyclic aliphatic hydrocarbons that are substituted with one or more straight-chained or branched aliphatic hydrocarbons.

A "$C_{n-m}$ hydrocarbon" or "$C_n$-$C_m$ hydrocarbon" or "Cn-Cm hydrocarbon", where n and m are integers, is a hydrocarbon, as defined above, having from n to m carbon atoms. For instance, a $C_{1-150}$ hydrocarbon is a hydrocarbon as defined above which has from 1 to 150 carbon atoms, and a $C_{5-60}$ hydrocarbon is a hydrocarbon as defined above which has from 5 to 60 carbon atoms.

The term "alkane", as used herein, refers to a linear or branched chain saturated hydrocarbon compound. Examples of alkanes, are for instance, butane, pentane, hexane, heptane, octane, nonane, decane, undecane, dodecane, tridecane and tetradecane. Alkanes such as dimethylbutane may be one or more of the possible isomers of this compound. Thus, dimethylbutane includes 2,3-dimethybutane and 2,2-dimethylbutane. This also applies for all hydrocarbon compounds referred to herein including cycloalkane, alkene, cylcoalkene.

The term "cycloalkane", as used herein, refers to a saturated cyclic aliphatic hydrocarbon compound. Examples of cycloalkanes include cyclopropane, cyclobutane, cyclopentane, cyclohexane, methylcyclopentane, cycloheptane, methylcyclohexane, dimethylcyclopentane and cyclooctane. Examples of a C5-8 cycloalkane include cyclopentane, cyclohexane, methylcyclopentane, cycloheptane, methylcyclohexane, dimethylcyclopentane and cyclooctane. The terms "cycloalkane" and "naphthene" may be used interchangeably.

The term "alkene", as used herein, refers to a linear or branched chain hydrocarbon compound comprising one or more double bonds. Examples of alkenes are butene, pentene, hexene, heptene, octene, nonene, decene, undecene, dodecene, tridecene and tetradecene. Alkenes typically comprise one or two double bonds. The terms "alkene" and "olefin" may be used interchangeably. The one or more double bonds may be at any position in the hydrocarbon chain. The alkenes may be cis- or trans-alkenes (or as defined using E- and Z-nomenclature). An alkene comprising a terminal double bond may be referred to as an "alk-1-ene" (e.g. hex-1-ene), a "terminal alkene" (or a "terminal olefin"), or an "alphaalkene" (or an "alphaolefin"). The term "alkene", as used herein also often includes cycloalkenes.

The term "cylcoalkene", as used herein, refers to partially unsaturated cyclic hydrocarbon compound. Examples of a cycloalkene includes cyclobutene, cyclopentene, cyclohexene, cyclohexa-1,3-diene, methylcyclopentene, cycloheptene, methylcyclohexene, dimethylcyclopentene and cyclooctene. A cycloalkene may comprise one or two double bonds.

The term "aromatic hydrocarbon" or "aromatic hydrocarbon compound", as used herein, refers to a hydrocarbon compound comprising one or more aromatic rings. The aromatic rings may be monocyclic or polycyclic. Typically, an aromatic compound comprises a benzene ring. An aromatic compound may for instance be a C6-14 aromatic compound, a C6-12 aromatic compound or a C6-10 aromatic compound. Examples of C6-14 aromatic compounds are benzene, toluene, xylene, ethylbenzene, methylethylbenzene, diethylbenzene, naphthalene, methylnaphthalene, ethylnaphthalene and anthracene.

As used herein "metal species" is any compound comprising a metal atom. As such, a metal species includes the elemental metal, metal oxides and other compounds comprising a metal, i.e. metal carbides and hydrides. Suitably, the metal species is elemental metal. Suitably, the metal species is not a metal oxide.

As used herein, the term "non-oxygenated ceramic" refers to ceramic materials which do not contain an oxygen atom. Examples of non-oxygenated ceramics include carbides and nitrides.

As used herein, the term "heterogeneous mixture" refers to the physical combination of at least two different substances wherein the two different substances are not in the same phase. For instance, one substance may be a solid and one substance may be a liquid.

Process

In one aspect the present invention relates to a process for producing hydrogen comprising exposing a composition comprising a hydrocarbon to electromagnetic radiation in the presence of a solid catalyst, wherein the catalyst comprises:

at least one metal species, comprising one or more elements selected from Fe, Ni and Co; and a non-oxygenated ceramic.

In another aspect the present invention relates to a process for producing hydrogen comprising exposing a liquid composition comprising a hydrocarbon to electromagnetic radiation in the presence of a solid catalyst, wherein the catalyst comprises:

at least one metal species, comprising one or more elements selected from Fe, Ni and Co; and a non-oxygenated ceramic.

In one embodiment, the process produces about 80 vol. % or more of hydrogen in the total amount of evolved gas. Suitably, about 85 vol. % or more of hydrogen in the total amount of evolved gas, more suitably about 90 vol. % or more of hydrogen, more suitably about 91 vol. % or more of hydrogen, more suitably about 92 vol. % or more of hydrogen, more suitably about 93 vol. % or more of hydrogen, more suitably about 94 vol. % or more of hydrogen, more suitably about 95 vol. % or more of hydrogen, more suitably about 96 vol. % or more of hydrogen, more suitably about 97 vol. % or more of hydrogen, more suitably about 98 vol. % or more of hydrogen, more suitably about 99 vol. % or more of hydrogen in the total amount of evolved gas.

In one embodiment, the process produces about 80 vol. % to about 99 vol. % of hydrogen in the total amount of evolved gas. Suitably, about 85 vol. % to about 99 vol. % of hydrogen in the total amount of evolved gas, more suitably about 90 vol. % to about 99 vol. % of hydrogen, more suitably about 91 vol. % to about 99 vol. % of hydrogen, more suitably about 92 vol. % to about 99 vol. % of hydrogen, more suitably about 93 vol. % to about 99 vol. % of hydrogen, more suitably about 94 vol. % to about 99 vol. % of hydrogen, more suitably about 95 vol. % to about 99 vol. % of hydrogen, more suitably about 96 vol. % to about 99 vol. % of hydrogen, more suitably about 97 vol. % to about 99 vol. % of hydrogen, more suitably about 98 vol. % to about 99 vol. % of hydrogen in the total amount of evolved gas.

In one embodiment, the process produces about 80 vol. % to about 98 vol. % of hydrogen in the total amount of evolved gas. Suitably, about 85 vol. % to about 98 vol. % of hydrogen in the total amount of evolved gas, more suitably about 90 vol. % to about 98 vol. % of hydrogen, more suitably about 91 vol. % to about 98 vol. % of hydrogen, more suitably about 92 vol. % to about 98 vol. % of hydrogen, more suitably about 93 vol. % to about 98 vol. % of hydrogen, more suitably about 94 vol. % to about 98 vol. % of hydrogen, more suitably about 95 vol. % to about 98 vol. % of hydrogen, more suitably about 96 vol. % to about 98 vol. % of hydrogen, more suitably about 97 vol. % to about 98 vol. % of hydrogen in the total amount of evolved gas.

In one embodiment, the process produces about 10 vol. % or less of carbon dioxide in the total amount of evolved gas. Suitably, about 9 vol. % or less of carbon dioxide in the total amount of evolved gas, more suitably about 8 vol. % or less of carbon dioxide, more suitably about 7 vol. % or less of carbon dioxide, more suitably about 6 vol. % or less of carbon dioxide, more suitably about 5 vol. % or less of carbon dioxide, more suitably about 4 vol. % or less of carbon dioxide, more suitably about 3 vol. % or less of carbon dioxide, more suitably about 2 vol. % or less of carbon dioxide, more suitably about 1 vol. % or less of carbon dioxide, more suitably about 0.5 vol. % or less of carbon dioxide, more suitably about 0.3 vol. % or less of carbon dioxide in the total amount of evolved gas, more suitably about 0.2 vol. % or less of carbon dioxide in the total amount of evolved gas, more suitably about 0.1 vol. % or less of carbon dioxide in the total amount of evolved gas.

In one embodiment, the process produces about 0.1 vol. % to about 10 vol. % of carbon dioxide in the total amount of evolved gas. Suitably, about 0.1 vol. % to about 9 vol. % of carbon dioxide in the total amount of evolved gas, more suitably about 0.1 vol. % to about 8 vol. % of carbon dioxide, more suitably about 0.1 vol. % to about 7 vol. % of carbon dioxide, more suitably about 0.1 vol. % to about 6 vol. % of carbon dioxide, more suitably about 0.1 vol. % to about 5 vol. % of carbon dioxide, more suitably about 0.1 vol. % to about 4 vol. % of carbon dioxide, more suitably about 0.1 vol. % to about 3 vol. % of carbon dioxide, more suitably about 0.1 vol. % to about 2 vol. % of carbon dioxide, more suitably about 0.1 vol. % to about 1 vol. % of carbon dioxide, more suitably about 0.1 vol. % to about 0.5 vol. % of carbon dioxide, more suitably about 0.1 vol. % to about 0.3 vol. % of carbon dioxide in the total amount of evolved gas, more suitably about 0.1 vol. % to about 0.2 vol. % of carbon dioxide in the total amount of evolved gas.

In one embodiment, the process produces about 10 vol. % or less of carbon monoxide in the total amount of evolved gas. Suitably, about 9 vol. % or less of carbon monoxide in the total amount of evolved gas, more suitably about 8 vol. % or less of carbon monoxide, more suitably about 7 vol. % or less of carbon monoxide, more suitably about 6 vol. % or less of carbon monoxide, more suitably about 5 vol. % or less of carbon monoxide, more suitably about 4 vol. % or less of carbon monoxide, more suitably about 3 vol. % or less of carbon monoxide, more suitably about 2 vol. % or less of carbon monoxide, more suitably about 1 vol. % or less of carbon monoxide, more suitably about 0.5 vol. % or less of carbon monoxide, more suitably about 0.3 vol. % or less of carbon monoxide in the total amount of evolved gas, more suitably about 0.2 vol. % or less of carbon monoxide in the total amount of evolved gas, more suitably about 0.1 vol. % or less of carbon monoxide in the total amount of evolved gas.

In one embodiment, the process produces about 0.2 vol. % to about 10 vol. % of carbon monoxide in the total amount of evolved gas. Suitably, about 0.2 vol. % to about 9 vol. % of carbon monoxide in the total amount of evolved gas, more suitably about 0.2 vol. % to about 8 vol. % of carbon monoxide, more suitably about 0.2 vol. % to about 7 vol. % of carbon monoxide, more suitably about 0.2 vol. % to about 6 vol. % of carbon monoxide, more suitably about 0.2 vol. % to about 5 vol. % of carbon monoxide, more suitably about 0.2 vol. % to about 4 vol. % of carbon monoxide, more suitably about 0.2 vol. % to about 3 vol. % of carbon monoxide, more suitably about 0.2 vol. % to about 2 vol. % of carbon monoxide, more suitably about 0.2 vol. % to about 1 vol. % of carbon monoxide, more suitably about 0.2 vol. % to about 0.5 vol. % of carbon monoxide, more suitably about 0.2 vol. % to about 0.3 vol. % of carbon monoxide in the total amount of evolved gas, more suitably about 0.2 vol. % to about 0.2 vol. % of carbon monoxide in the total amount of evolved gas.

In one embodiment, the process produces about 10 vol. % or less of methane in the total amount of evolved gas. Suitably, about 9 vol. % or less of methane in the total amount of evolved gas, more suitably about 8 vol. % or less of methane, more suitably about 7 vol. % or less of methane, more suitably about 6 vol. % or less of methane, more suitably about 5 vol. % or less of methane, more suitably about 4 vol. % or less of methane, more suitably about 3 vol. % or less of methane, more suitably about 2 vol. % or less of methane, more suitably about 1 vol. % or less of methane, more suitably about 0.5 vol. % or less of methane, more suitably about 0.3 vol. % or less of methane in the total amount of evolved gas, more suitably about 0.2 vol. % or less of methane in the total amount of evolved gas, more suitably about 0.1 vol. % or less of methane in the total amount of evolved gas.

In one embodiment, the process produces about 0.05 vol. % to about 10 vol. % of methane in the total amount of evolved gas. Suitably, about 0.05 vol. % to about 9 vol. % of methane in the total amount of evolved gas, more suitably about 0.05 vol. % to about 8 vol. % of methane, more suitably about 0.05 vol. % to about 7 vol. % of methane, more suitably about 0.05 vol. % to about 6 vol. % of methane, more suitably about 0.05 vol. % to about 5 vol. % of methane, more suitably about 0.05 vol. % to about 4 vol. % of methane, more suitably about 0.05 vol. % to about 3 vol. % of methane, more suitably about 0.05 vol. % to about 2 vol. % of methane, more suitably about 0.05 vol. % to about 1 vol. % of methane, more suitably about 0.05 vol. % to about 0.5 vol. % of methane, more suitably about 0.05 vol. % to about 0.3 vol. % of methane in the total amount of evolved gas, more suitably about 0.05 vol. % to about 0.2 vol. % of methane in the total amount of evolved gas.

In one embodiment, the process produces about 10 vol. % or less of ethylene in the total amount of evolved gas. Suitably, about 9 vol. % or less of ethylene in the total amount of evolved gas, more suitably about 8 vol. % or less of ethylene, more suitably about 7 vol. % or less of ethylene, more suitably about 6 vol. % or less of ethylene, more suitably about 5 vol. % or less of ethylene, more suitably about 4 vol. % or less of ethylene, more suitably about 3 vol. % or less of ethylene, more suitably about 2 vol. % or less of ethylene, more suitably about 1 vol. % or less of ethylene, more suitably about 0.5 vol. % or less of ethylene, more suitably about 0.3 vol. % or less of ethylene in the total amount of evolved gas, more suitably about 0.2 vol. % or less of ethylene in the total amount of evolved gas, more suitably about 0.1 vol. % or less of ethylene in the total amount of evolved gas.

In one embodiment, the process produces about 0.05 vol. % to about 10 vol. % of ethylene in the total amount of evolved gas. Suitably, about 0.05 vol. % to about 9 vol. % of ethylene in the total amount of evolved gas, more suitably about 0.05 vol. % to about 8 vol. % of ethylene, more suitably about 0.05 vol. % to about 7 vol. % of ethylene, more suitably about 0.05 vol. % to about 6 vol. % of ethylene, more suitably about 0.05 vol. % to about 5 vol. % of ethylene, more suitably about 0.05 vol. % to about 4 vol. % of ethylene, more suitably about 0.05 vol. % to about 3 vol. % of ethylene, more suitably about 0.05 vol. % to about 2 vol. % of ethylene, more suitably about 0.05 vol. % to about 1 vol. % of ethylene, more suitably about 0.05 vol. % to about 0.5 vol. % of ethylene, more suitably about 0.05 vol. % to about 0.3 vol. % of ethylene in the total amount of evolved gas, more suitably about 0.05 vol. % to about 0.2 vol. % of ethylene in the total amount of evolved gas.

In one embodiment, the process produces about 90 vol. % hydrogen or more and about 0.5 vol. % of carbon dioxide or less in the total evolved gas. Suitably, in this embodiment, the amount of carbon dioxide is 0.4 vol. % or less, more suitably 0.3 vol. % or less, more suitably 0.2 vol. % or less, more suitably 0.1 vol. % or less in the total evolved gas.

In one embodiment, the process produces about 90 vol. % to about 98 vol. % hydrogen and about 0.5 vol. % of carbon dioxide or less in the total evolved gas. Suitably, in this embodiment, the amount of carbon dioxide is 0.4 vol. % or less, more suitably 0.3 vol. % or less, more suitably 0.2 vol. % or less, more suitably 0.1 vol. % or less in the total evolved gas.

In one embodiment, the process produces about 90 vol. % to about 98 vol. % hydrogen and about 0.1 vol. % to about 0.5 vol. % of carbon dioxide in the total evolved gas.

In one embodiment, the process produces about 90 vol. % to about 98 vol. % hydrogen and about 0.1 vol. % to about 0.5 vol. % of carbon dioxide and about 5 vol. % or less of carbon monoxide in the total evolved gas. Suitably, in this embodiment, the amount of carbon monoxide is 4 vol. % or less, more suitably 3 vol. % or less, more suitably 2 vol. % or less, more suitably 1 vol. % or less, more suitably 0.5 vol. % or less in the total evolved gas.

In one embodiment, the process produces about 90 vol. % to about 98 vol. % hydrogen and about 0.1 vol. % to about 0.5 vol. % of carbon dioxide and about 0.2 vol. % to about 5 vol. % of carbon monoxide in the total evolved gas.

In one embodiment, the process produces about 90 vol. % to about 98 vol. % hydrogen, and about 0.1 vol. % to about 0.5 vol. % of carbon dioxide, and about 0.2 vol. % to about 5 vol. % of carbon monoxide, and about 5 vol. % or less of ethylene in the total evolved gas. Suitably, in this embodiment, the amount of carbon monoxide is 4 vol. % or less, more suitably 3 vol. % or less, more suitably 2 vol. % or less, more suitably 1 vol. % or less, more suitably 0.5 vol. % or less in the total evolved gas.

In one embodiment, the process produces about 90 vol. % to about 98 vol. % hydrogen and about 0.1 vol. % to about 0.5 vol. % of carbon dioxide and about 0.2 vol. % to about 5 vol. % of carbon monoxide and about 0.2 vol. % to about 5 vol. % of ethylene in the total evolved gas.

In one embodiment, the process produces about 95 vol. % to about 98 vol. % hydrogen and about 0.1 vol. % to about 0.5 vol. % of carbon dioxide and about 0.2 vol. % to about 1 vol. % of carbon monoxide and about 0.2 vol. % to about 1 vol. % of ethylene in the total evolved gas.

In one embodiment, the process is carried out in an environment substantially free of oxygen. Suitably, an environment free of oxygen. In another embodiment, process comprises exposing the composition to electromagnetic radiation in an environment substantially free of oxygen, suitably free of oxygen.

In another embodiment, the process is carried out in an environment substantially free of water. Suitably, an environment free of water. In another embodiment, process comprises exposing the composition to electromagnetic radiation in an environment substantially free of water, suitably free of water.

In another embodiment, the process is carried out in an environment substantially free of oxygen and water. Suitably, an environment free of oxygen and water. In another embodiment, process comprises exposing the composition to electromagnetic radiation in an environment substantially free of oxygen and water, suitably free of oxygen and water.

In another embodiment, the process is carried out in an inert atmosphere. In another embodiment, process comprises exposing the composition to electromagnetic radiation in an inert atmosphere.

The inert atmosphere may for instance be an inert gas or a mixture of inert gases. The inert gas or mixture of inert gases typically comprises a noble gas, for instance argon. In one embodiment the inert gas is argon.

The process may further comprise purging the composition with the inert gas or mixture of inert gases prior to exposing the composition to the electromagnetic radiation.

In one embodiment the composition is contacted with the solid catalyst prior to, during or both prior to and during exposure to the electromagnetic radiation.

The composition may be contacted with the catalyst by any suitable method. For instance, the at least one composition may be contacted with the catalyst by spraying the composition onto the catalyst surface, or by continuously feeding the composition over the catalyst, for instance by using a fluidized bed.

The proportion of the catalyst relative to the total weight composition at any one time, is typically from 0.1 wt. % to 99.9 wt. %. Suitably, from 5 wt. % to 95 wt. %. It may for instance be from 10 wt. % to 90 wt. %, or for instance from 15 wt. % to 85 wt. %. In some embodiments, for instance, it is from 30 wt. % 20 to 70 wt. %, or for instance from 40 wt. % to 50 wt. In another embodiment, the percentage by weight of the catalyst in the composition, based on the total weight of the composition, is from 1 wt. % to 60 wt. %. It may for instance be from 1 wt. % to 55 wt. %, or for instance from 5 wt. % to 40 wt. %. In some embodiments, for instance, it is from 5 wt. % to 30 wt. %, or for instance from 5 wt. % to 20 wt. %.

Similarly, the proportion of the composition relative to the total weight of the catalyst, is typically from 99.9 wt. % to 0.1 wt. %. It may for instance be from 95 wt. % to 5 wt. %. For example, it may be from 90 wt. % to 10 wt. %, or for instance from 85 wt. % to 15 wt. %. In some embodiments, for instance, it is from 70 wt. % to 30 wt. %, or for instance from 60 wt. % to 30 wt. %. More typically, the proportion of the composition relative to the total weight of the catalyst, is from 99 wt. % to 30 wt. %. It may for instance be from 99 wt. % to 45 wt. %, or for instance from 95 wt. % to 60 wt. %. In some embodiments, for instance, it is from 95 wt. % to 70 wt. %, or for instance from 95 wt. % to 80 wt. %.

In the process of the invention, the composition is exposed to electromagnetic radiation in the presence of the catalyst in order to effect, or activate, the decomposition of said hydrocarbon in the composition to produce hydrogen.

Said decomposition may be catalytic decomposition. Exposing the composition to the electromagnetic radiation may cause the composition to heat up, but does not necessarily cause it to be heated. Other possible effects of the electromagnetic radiation to which the composition is exposed (which may be electric or magnetic field effects) include, but are not limited to, field emission, plasma generation and work function modification. For instance, the high fields involved can modify catalyst work functions and can lead to the production of plasmas at the catalyst surface, further shifting the character of the chemical processes involved. Any one or more of such effects of the electromagnetic radiation may be responsible for, or at least contribute to, effecting, or activating, the catalytic decomposition of the composition to produce hydrogen.

Optionally, the process may further comprise heating the composition conventionally, i.e. heating the composition by a means other than exposing it to electromagnetic radiation. The process may, for instance, further comprise heating the composition externally. That is, the process may additionally comprise applying heat to the outside of the vessel, reactor or reaction cavity which contains the composition. As mentioned above, the process, and in particular the step of exposing the composition to the electromagnetic radiation, is often carried out under ambient conditions. For instance, it may be carried out at SATP, i.e. at a temperature of 298.15 K (25° C.) and at 100,000 Pa (1 bar, 14.5 psi, 0.9869 atm). The process, and in particular the step of exposing the composition to the electromagnetic radiation, may alternatively be carried out at temperatures and/or pressures other than SATP. Indeed, both very low and very high temperatures can be employed, i.e. from far below ambient to far above ambient, as could very low and high pressures. Usually, however, the step of exposing the composition to the electromagnetic radiation is carried out at temperatures and pressures that are at or relatively close to SATP.

The process may for instance comprise exposing the composition to the electromagnetic radiation, at a temperature of from −150° C. to 2,000° C., or for instance at a temperature of from −80° C. to 1,000° C., for instance from −20° C. to 400° C., for instance from 0° C. to 200° C., or at a temperature of from 5° C. to 100° C., or for instance from 10° C. to 50° C.

Additionally, the process may comprise exposing the composition to the electromagnetic radiation, at a pressure of from 0.01 bar to 100 bar, or for instance at a pressure of from 0.1 10 bar to 10 bar, for instance from 0.5 bar to 5 bar, or for example from 0.5 bar to 2 bar. In a more typical case, the process comprises exposing the composition to the electromagnetic radiation, at a temperature of from 0° C. to 200° C. and at a pressure of from 0.5 bar to 5 bar. For instance, it may comprise exposing the composition to the electromagnetic radiation, at a temperature of from 10° C. to 50° C. and at a pressure of from 15 0.5 bar to 2 bar.

Electromagnetic Radiation

The electromagnetic radiation that is employed in the process of the invention, in order to effect production of hydrogen from the composition may be radio frequency radiation, microwave frequency radiation, millimetre wave radiation, infrared radiation, optical radiation or UV radiation. A range of electromagnetic frequencies may be used independently, or in combination with one another, to irradiate the sample, including radio frequencies, microwave frequencies, millimetre waves, infrared, optical and UV.

Typically, however, the electromagnetic radiation that is employed in the process of the invention is microwave radiation. The term "microwave radiation", as used herein, takes its normal meaning, typically referring to electromagnetic radiation having a wavelength of from one meter to one millimetre, and having a corresponding frequency of from 300 MHz (100 cm) to 300 GHz (0.1 cm).

In one embodiment, the electromagnetic radiation is microwave radiation.

In principle, microwave radiation having any frequency in the microwave range, i.e. any frequency of from 300 MHz to 300 GHz, may be employed in the present invention. Typically, however, microwave radiation having a frequency of from 900 MHz to 4 GHz, or for instance from 900 MHz to 3 GHz, is employed.

In one embodiment, the electromagnetic radiation is microwave radiation having a frequency of from about 1 GHz to about 4 GHz. Suitably, the microwave radiation has a frequency of about 2 GHz to about 4 GHz, suitably about 2 GHz to about 3 GHz, suitably about 2.45 GHz.

The power which the electromagnetic radiation needs to delivered to the composition, in order to effect the decomposition of the hydrocarbon to produce hydrogen, will vary, according to, for instance, the particular hydrocarbons employed in the composition, the particular catalyst employed in the composition, and the size, permittivity, particle packing density, shape and morphology of the composition. The skilled person, however, is readily able to determine a level of power which is suitable for effecting the decomposition of a particular composition.

The process of the invention may for example comprise exposing the composition to electromagnetic radiation which delivers a power, per cubic centimetre of the composition, of at least 1 Watt. It may however comprise exposing the composition to electromagnetic radiation which delivers a power, per cubic centimetre of the composition, of at least 5 Watts.

Often, for instance, the process comprises exposing the composition to electromagnetic radiation which delivers to the composition a power of at least 10 Watts, or for instance at least 20 Watts, per cubic centimetre of the composition. The process of the invention may for instance comprise exposing the composition to electromagnetic radiation which delivers to the composition at least 25 Watts per cubic centimetre of the composition.

Often, for instance, the process comprises exposing the composition to electromagnetic radiation which delivers a power of from about 0.1 Watt to about 5000 Watts per cubic centimetre of the composition. More typically, the process comprises exposing the composition to electromagnetic radiation which delivers a power of from about 0.5 Watts to 30 about 1000 Watts per cubic centimetre of the composition, or for instance a power of from about 1 Watt to about 500 Watts per cubic centimetre of the composition, such as, for instance, a power of from about 1.5 Watts to about 200 Watts, or say, from 2 Watts to 100 Watts, per cubic centimetre of the composition.

In some embodiments, for instance the process comprises exposing the composition to electromagnetic radiation which delivers to the composition from about 5 Watts to about 100 Watts per cubic centimetre of the composition, or for instance from about 10 Watts to about 100 Watts per cubic centimetre, or for instance from about 20 Watts, or from about 25 Watts, to about 80 Watts per cubic centimetre of the composition.

In some embodiments, for instance, the process comprises exposing the composition to electromagnetic radiation which delivers a power of from about 2.5 to about 60 Watts per cubic centimetre of the composition. Thus, for example, if the volume of the composition is 3.5 cm3, the process of the invention typically comprises exposing the composition to electromagnetic radiation which delivers about 10 W to about 200 W to the composition (i.e. the "absorbed power" is from about 10 W to about 200 W).

Often, the power delivered to the composition (or the "absorbed power") is ramped up during the process of the invention. Thus, the process may comprise exposing the composition to electromagnetic radiation which delivers a first power to the composition, and then exposing the composition to electromagnetic radiation which delivers a second power to the composition, wherein the second power is greater than the first. The first power may for instance be from about 2.5 Watts to about 6 Watts per cubic centimetre of the composition. The second power may for instance be from about 25 Watts to about 60 Watts per cubic centimetre of the composition. Often in these embodiments, the electromagnetic radiation is microwave radiation, which may be as further defined hereinbefore.

The duration of exposure of the composition to the electromagnetic radiation may also vary in the process of the invention. Embodiments are, for instance, envisaged wherein a given composition is exposed to electromagnetic radiation over a relatively long period of time, to effect sustained decomposition of the composition on a continuous basis to produce hydrogen over a sustained period.

In some embodiments, exposing the composition to the electromagnetic radiation causes the composition to be heated. Electromagnetic heating provides a method of fast, selective heating of dielectric and magnetic materials. Rapid and efficient heating using microwaves is an example in which inhomogeneous field distributions in dielectric mixtures and field-focusing effects can lead to dramatically different product distributions. The fundamentally different mechanisms involved in electromagnetic heating may cause enhanced reactions and new reaction pathways. Furthermore, the high fields involved can modify catalyst work functions and can lead to the production of plasmas at the catalyst surface, further shifting the character of the chemical processes involved.

In one embodiment, the process of the invention comprises heating said composition by exposing the composition to the electromagnetic radiation, suitably microwave radiation.

Composition

In one embodiment, the composition is a liquid composition.

The liquid composition is in the liquid state at standard ambient temperature and pressure (SATP), i.e. at a temperature of 298.15 K (25° C.) and at 100,000 Pa (1 bar, 14.5 psi, 0.9869 atm). Said liquid composition is not necessarily therefore in the liquid state under the conditions (i.e. the temperature and pressure) under which the process is carried out, because the process may for example be carried out at an elevated temperature and/or at a reduced pressure such that composition may be in the gaseous state under those conditions. In many cases, however, that is not the case and the composition is also in the liquid state under the conditions (i.e. the temperature and pressure) under which the process is carried out.

In one embodiment, the composition comprises only one hydrocarbon. In another embodiment, the composition comprises a mixture of hydrocarbons.

In addition to hydrocarbons, the composition may contain other components such as oxygenated species (alcohols, ethers, esters), nitrates and antioxidants.

In one embodiment, the composition is substantially free of oxygenated species. In another embodiment, the composition is free of oxygenated species.

In one embodiment, the composition is substantially free of oxygen. In another embodiment, the composition is free of oxygen.

In one embodiment, the composition is substantially free of water. In another embodiment, the composition is free of water.

In one embodiment, the composition is substantially free of oxygenated species and water. In another embodiment, the composition is free of oxygenated species and water.

In one embodiment, the composition is substantially free of oxygen, oxygenated species and water. In another embodiment, the composition is free of oxygen, oxygenated species and water.

In one embodiment, the composition essentially consists of hydrocarbons. In another embodiment, the composition consists of hydrocarbons. In these embodiments, the hydrocarbons may be selected from diesel range hydrocarbons, $C_9$ to $C_{60}$ hydrocarbons, $C_9$ to $C_{24}$ hydrocarbons, $C_9$ to $C_{20}$ hydrocarbons, $C_9$ to $C_{17}$ hydrocarbons and $C_{10}$ to $C_{15}$ hydrocarbons.

In another embodiment, the composition comprises about 50 wt. % or more of $C_9$ to $C_{60}$ hydrocarbons. For instance, the composition comprises 75 wt. % or more of $C_9$ to $C_{60}$ hydrocarbons. Suitably, the composition comprises about 90 wt. % or more of $C_9$ to $C_{60}$ hydrocarbons, more suitably the composition comprises about 95 wt. % of $C_9$ to $C_{60}$ hydrocarbons.

In another embodiment, the composition comprises about 50 wt. % or more of $C_9$ to $C_{24}$ hydrocarbons. For instance, the composition comprises 75 wt. % or more of $C_9$ to $C_{24}$ hydrocarbons. Suitably, the composition comprises about 90 wt. % or more of $C_9$ to $C_{24}$ hydrocarbons, more suitably the composition comprises about 95 wt. % of $C_9$ to $C_{24}$ hydrocarbons.

In another embodiment, the composition comprises about 50 wt. % or more of $C_9$ to $C_{20}$ hydrocarbons. For instance, the composition comprises 75 wt. % or more of $C_9$ to $C_{20}$ hydrocarbons. Suitably, the composition comprises about 90 wt. % or more of $C_9$ to $C_{20}$ hydrocarbons, more suitably the composition comprises about 95 wt. % of $C_9$ to $C_{20}$ hydrocarbons.

In another embodiment, the composition comprises about 50 wt. % or more of $C_9$ to $C_{17}$ hydrocarbons. For instance, the composition comprises 75 wt. % or more of $C_9$ to $C_{17}$ hydrocarbons. Suitably, the composition comprises about 90 wt. % or more of $C_9$ to $C_{17}$ hydrocarbons, more suitably the composition comprises about 95 wt. % of $C_9$ to $C_{17}$ hydrocarbons.

In another embodiment, the composition comprises about 50 wt. % or more of $C_{10}$ to $C_{15}$ hydrocarbons. For instance, the composition comprises 75 wt. % or more of $C_{10}$ to $C_{15}$ hydrocarbons. Suitably, the composition comprises about 90 wt. % or more of $C_{10}$ to $C_{15}$ hydrocarbons, more suitably the composition comprises about 95 wt. % of $C_{10}$ to $C_{15}$ hydrocarbons.

In one embodiment, the composition essentially consists of/consists of petro-diesel. In another embodiment, the composition essentially consists of/consists of non-oxygenated petro-diesel. In another embodiment, the composition essentially consists of/consists of commercial diesel.

As used herein, the term "petro-diesel" is used to refer to the diesel fraction obtained from refining petroleum.

As used herein, the term "commercial diesel" refers to the diesel fraction obtained from refining petroleum after it had been formulated for sale to motorists.

In one embodiment, the hydrocarbon comprises/essentially consists of/consists of diesel range hydrocarbons.

In one embodiment, the hydrocarbon comprises/essentially consists of/consists of $C_8$ to $C_{60}$ hydrocarbons. For instance, the hydrocarbon comprises/essentially consists of/consists of $C_8$ to $C_{24}$ hydrocarbons. Suitably, the hydrocarbon comprises/essentially consists of/consists of $C_9$ to $C_{20}$ hydrocarbons, more suitably the hydrocarbon comprises/essentially consists of/consists of $C_9$ to $C_{17}$ hydrocarbons; more suitably the hydrocarbon comprises/essentially consists of/consists of $C_{10}$ to $C_{15}$ hydrocarbons.

In one embodiment, the hydrocarbon(s) are liquid hydrocarbons at SATP.

Typically, the hydrocarbons referred to above are straight-chained, branched or cyclic, alkanes. However, in one embodiment, the hydrocarbons referred to above comprise a mixture of straight-chained, branched or cyclic, alkanes; straight-chained, branched or cyclic olefins and aromatic hydrocarbons.

Solid Catalyst

The solid catalyst employed in the process of the present invention comprises at least one metal species comprising one or more elements selected from Fe, Ni and Co. Unless stated to the contrary, reference to elements by use of standard notation refers to said element in any available oxidation state. Similarly, wherein the term "metal" is used without further restriction no limitation to oxidation state is intended other than to those available.

However, as used herein, the term "elemental metal" or specific examples such as "elemental Fe", "elemental Ni" and "elemental Co" for example, refers to the metal only when in an oxidation state of zero.

In one embodiment, said metal species comprises an elemental metal selected from elemental Fe, elemental Ni and elemental Co or a combination thereof.

In another embodiment, said metal species comprises an elemental metal selected from elemental Fe and elemental Ni or a combination thereof.

In one embodiment, said metal species consists of an elemental metal selected from elemental Fe, elemental Ni and elemental Co or a combination thereof.

In another embodiment, said metal species consists of an elemental metal selected from elemental Fe and elemental Ni or a combination thereof.

However, the metal species may take forms other than elemental metals. Accordingly, in one embodiment the metal species is selected from an elemental metal, an organometallic compound, a metal hydride and a metal carbide. Suitably, the metal species is selected from an elemental metal, a metal hydride and a metal carbide.

In one embodiment, the metal species is not a metal oxide or does not comprise a metal oxide.

In addition, to comprising one or more elements selected from Fe, Ni and Co, the metal species may further comprise a transition metal.

As used herein, the term "transition metal" refers to an element of one of the three series of elements arising from the filling of the 3d, 4d and 5d shells. Unless stated to the contrary, reference to transition metals in general or by use of standard notation of specific transition metals refers to said element in any available oxidation state.

In one embodiment the metal species additionally comprises a transition metal selected from Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn.

In another embodiment the metal species additionally comprises a transition metal selected from Ti, V, Nb, Ta, Cr, Mo, W, Mn, Tc, Re, Fe, Ru, Os, Co, Rh, Ir, Ni, Pd, Pt, Cu, Ag, Au and Zn.

In another embodiment the metal species additionally comprises a transition metal selected from V, Nb, Ta, Cr, Mo, W, Mn, Tc, Re, Fe, Ru, Os, Co, Rh, Ir, Ni, Pd, Pt, Cu, Ag, Au and Zn.

In another embodiment, the metal species additionally comprises a transition metal selected from Fe, Ru, Os, Co, Rh, Ir, Ni, Pd, Pt and Cu.

In another embodiment, the metal species additionally comprises a transition metal selected from Fe, Ru, Co, Ni and Cu.

Suitably, the metal species additionally comprises a transitional metal in elemental form. As used herein, a transition metal said to be in elemental form or reference to a specific elemental transition metal, refers to said transition metal at an oxidation state of zero.

In one embodiment, the transition metal is not a transition metal oxide.

In one embodiment the metal species additionally comprises an elemental transition metal selected from Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn.

In another embodiment the metal species additionally comprises an elemental transition metal selected from Ti, V, Nb, Ta, Cr, Mo, W, Mn, Tc, Re, Fe, Ru, Os, Co, Rh, Ir, Ni, Pd, Pt, Cu, Ag, Au and Zn.

In another embodiment the metal species additionally comprises an elemental metal selected from V, Nb, Ta, Cr, Mo, W, Mn, Tc, Re, Fe, Ru, Os, Co, Rh, Ir, Ni, Pd, Pt, Cu, Ag, Au and Zn.

In another embodiment, the metal species additionally comprises an elemental metal selected from Fe, Ru, Os, Co, Rh, Ir, Ni, Pd, Pt and Cu.

In another embodiment, the metal species additionally comprises an elemental metal selected from Fe, Ru, Co, Ni and Cu.

In one embodiment, the metal species comprises (i) one or more of elemental Fe, elemental Ni and elemental Co; and (ii) a transition metal in elemental form.

In one embodiment, the metal species comprises (i) one or more of elemental Fe and elemental Ni; and (ii) a transition metal in elemental form.

In one embodiment, the metal species comprises (i) one or more of elemental Fe, elemental Ni and elemental Co; and (ii) a transition metal in elemental form selected form elemental Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn.

In one embodiment, the metal species comprises (i) one or more of elemental Fe, elemental Ni and elemental Co; and (ii) a transition metal in elemental form selected form elemental Fe, Ru, Os, Co, Rh, Ir, Ni, Pd, Pt and Cu.

In one embodiment, the metal species comprises (i) one or more of elemental Fe, elemental Ni and elemental Co; and (ii) a transition metal in elemental form selected form elemental Fe, Ru, Co, Ni and Cu.

In one embodiment, the metal species comprises (i) one or more of elemental Fe and elemental Ni; and (ii) a transition metal in elemental form selected form elemental Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn.

In one embodiment, the metal species comprises (i) one or more of elemental Fe and elemental Ni; and (ii) a transition metal in elemental form selected form elemental Fe, Ru, Os, Co, Rh, Ir, Ni, Pd, Pt and Cu.

In one embodiment, the metal species comprises (i) one or more of elemental Fe and elemental Ni; and (ii) a transition metal in elemental form selected form elemental Fe, Ru, Co, Ni and Cu.

In one embodiment, the metal species consists of (i) one or more of elemental Fe, elemental Ni and elemental Co; and (ii) a transition metal in elemental form selected form elemental Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn.

In one embodiment, the metal species consists of (i) one or more of elemental Fe, elemental Ni and elemental Co; and (ii) a transition metal in elemental form selected form elemental Fe, Ru, Os, Co, Rh, Ir, Ni, Pd, Pt and Cu.

In one embodiment, the metal species consists of (i) one or more of elemental Fe, elemental Ni and elemental Co; and (ii) a transition metal in elemental form selected form elemental Fe, Ru, Co, Ni and Cu.

In one embodiment, the metal species consists of (i) one or more of elemental Fe and elemental Ni; and (ii) a transition metal in elemental form selected form elemental Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn.

In one embodiment, the metal species consists of (i) one or more of elemental Fe and elemental Ni; and (ii) a transition metal in elemental form selected form elemental Fe, Ru, Os, Co, Rh, Ir, Ni, Pd, Pt and Cu.

In one embodiment, the metal species consists of (i) one or more of elemental Fe and elemental Ni; and (ii) a transition metal in elemental form selected form elemental Fe, Ru, Co, Ni and Cu.

In one embodiment, the metal species consists of (i) one or more of elemental Fe and elemental Ni; and (ii) a transition metal in elemental form selected form elemental Fe, Ru, Co, Ni and Cu.

In one embodiment, the metal species consists of elemental Fe and optionally one or more of elemental Ni, elemental Ru, elemental Co and elemental Cu.

In one embodiment, the metal species consists of elemental Fe and optionally one of elemental Ni, elemental Ru, elemental Co and elemental Cu.

In one embodiment, the metal species consists of elemental Ni and optionally one or more of elemental Fe, elemental Ru, elemental Co and elemental Cu.

In one embodiment, the metal species consists of elemental Ni and optionally one of elemental Fe, elemental Ru, elemental Co and elemental Cu.

In one embodiment, the metal species comprises/essentially consists of/consists of a binary mixture of elemental metals selected from elemental Fe and elemental Ni (Fe/Ni), elemental Fe and elemental cobalt (Fe/Co), elemental Fe and elemental Ru (Fe/Ru), elemental Fe and elemental Cu (Fe/Cu), elemental Ni and elemental Co (Ni/Co), elemental Ni and elemental Ru (Ni/Ru); and elemental Ni and elemental Cu (Ni/Cu).

In another embodiment, the metal species comprises/essentially consists of/consists of a binary mixture of elemental metals selected from elemental Fe and elemental Ni (Fe/Ni), elemental Fe and elemental cobalt (Fe/Co), elemental Fe and elemental Ru (Fe/Ru); and elemental Fe and elemental Cu (Fe/Cu).

In another embodiment, the metal species comprises/essentially consists of/consists of a binary mixture of elemental Fe and elemental Ni (Fe/Ni).

In each of the embodiments above, where a binary mixture of elemental metals is present, the ratio of elemental metals may be in the range of about 100:1 to 1:100, suitably about 50:1 to 1:50, more suitably about 25:1 to 1:25, about 10:1 to about 1:10, more suitably about 5:1 to 1:5, more suitably about 1:1.

In one embodiment, the metal species comprises/essentially consists of/consists of a binary mixture of elemental Fe and elemental Ni (Fe/Ni) in a ratio of about 5:1 to 1:5, suitably about 1:1.

In one embodiment, the metal species is an alloy. In particular, in one embodiment the metal species is an alloy of two elemental metals selected from elemental Fe, elemental Ni and elemental Co.

Typically, the catalyst comprises particles of said metal species. The particles are usually nanoparticles.

Suitably, where said metal species comprises/essentially consists of/consists of metal(s) in elemental said species is suitably present as nanoparticles.

As used herein the term "nanoparticle" means a microscopic particle whose size is typically measured in nanometres (nm). A nanoparticle typically has a particle size of from 0.5 nm to 500 nm. For instance, a nanoparticle may have a particle size of from 0.5 nm to 200 nm. More often, a nanoparticle has a particle size of from 0.5 nm to 100 nm, or for instance from 1 nm to 50 nm. A particle, for instance a nanoparticle, may be spherical or non-spherical. Non-spherical particles may for instance be plate-shaped, needle-shaped or tubular.

The term "particle size" as used herein means the diameter of the particle if the particle is spherical or, if the particle is non-spherical, the volume-based particle size. The volume-based particle size is the diameter of the sphere that has the same volume as the nonspherical particle in question.

In one embodiment, the particle size of the metal species may be in the nanoscale. For instance, the particle size diameter of the metal species may be in the nanoscale.

As used herein, a particle size diameter in the nanoscale refers to populations of nanoparticles having $d(0.5)$ values of 100 nm or less. For example, $d(0.5)$ values of 90 nm or less. For example, $d(0.5)$ values of 80 nm or less. For example, $d(0.5)$ values of 70 nm or less. For example, $d(0.5)$ values of 60 nm or less. For example, $d(0.5)$ values of 50 nm or less. For example, $d(0.5)$ values of 40 nm or less. For example, $d(0.5)$ values of 30 nm or less. For example, $d(0.5)$ values of 20 nm or less. For example, $d(0.5)$ values of 10 nm or less.

As used herein, "$d(0.5)$" (which may also be written as "$d(v, 0.5)$" or volume median diameter) represents the particle size (diameter) for which the cumulative volume of all particles smaller than the $d(0.5)$ value in a population is equal to 50% of the total volume of all particles within that population.

A particle size distribution as described herein (e.g. $d(0.5)$) can be determined by various conventional methods of analysis, such as Laser light scattering, laser diffraction, sedimentation methods, pulse methods, electrical zone sensing, sieve analysis and optical microscopy (usually combined with image analysis).

In one embodiment, a population of metal species of the process have $d(0.5)$ values of about 1 nm to about 100 nm. For example, $d(0.5)$ values of about 1 nm to about 90 nm. For example, $d(0.5)$ values of about 1 nm to about 80 nm. For example, $d(0.5)$ values of about 1 nm to about 70 nm. For example, $d(0.5)$ values of about 1 nm to about 60 nm. For example, $d(0.5)$ values of about 1 nm to about 50 nm. For example, $d(0.5)$ values of about 1 nm to about 40 nm.

For example, $d(0.5)$ values of about 1 nm to about 30 nm. For example, $d(0.5)$ values of about 1 nm to about 20 nm. For example, $d(0.5)$ values of about 1 nm to about 10 nm.

In another embodiment, a population of metal species of the process have $d(0.5)$ values of about 10 nm to about 100 nm. For example, $d(0.5)$ values of about 10 nm to about 90 nm. For example, $d(0.5)$ values of about 10 nm to about 80 nm. For example, $d(0.5)$ values of about 10 nm to about 70 nm. For example, $d(0.5)$ values of about 10 nm to about 60 nm. For example, $d(0.5)$ values of about 10 nm to about 50 nm. For example, $d(0.5)$ values of about 10 nm to about 40 nm. For example, $d(0.5)$ values of about 10 nm to about 30 nm. For example, $d(0.5)$ values of about 10 nm to about 20 nm. For example, $d(0.5)$ values of about 10 nm.

In another embodiment, a population of metal species of the process have have $d(0.5)$ values of about 20 nm to about 100 nm. For example, $d(0.5)$ values of about 20 nm to about 90 nm. For example, $d(0.5)$ values of about 20 nm to about 80 nm. For example, $d(0.5)$ values of about 20 nm to about 70 nm. For example, $d(0.5)$ values of about 20 nm to about 60 nm. For example, $d(0.5)$ values of about 20 nm to about 50 nm. For example, $d(0.5)$ values of about 20 nm to about 40 nm. For example, $d(0.5)$ values of about 20 nm to about 30 nm. For example, $d(0.5)$ values of about 20 nm.

In another embodiment, a population of metal species of the process have $d(0.5)$ values of about 30 nm to about 100 nm. For example, $d(0.5)$ values of about 30 nm to about 90 nm. For example, $d(0.5)$ values of about 30 nm to about 80 nm. For example, $d(0.5)$ values of about 30 nm to about 70 nm. For example, $d(0.5)$ values of about 30 nm to about 60 nm. For example, $d(0.5)$ values of about 30 nm to about 50 nm. For example, $d(0.5)$ values of about 30 nm to about 40 nm. For example, $d(0.5)$ values of about 30 nm.

In another embodiment, a population of metal species of the process have $d(0.5)$ values of about 20 nm to about 100 nm. For example, $d(0.5)$ values of about 40 nm to about 90 nm. For example, $d(0.5)$ values of about 40 nm to about 80 nm. For example, $d(0.5)$ values of about 40 nm to about 70 nm. For example, $d(0.5)$ values of about 40 nm to about 60 nm. For example, $d(0.5)$ values of about 40 nm to about 50 nm. For example, $d(0.5)$ values of about 40 nm.

In another embodiment, a population of metal species of the process have $d(0.5)$ values of about 50 nm to about 100 nm. For example, $d(0.5)$ values of about 50 nm to about 90 nm. For example, $d(0.5)$ values of about 50 nm to about 80 nm. For example, $d(0.5)$ values of about 50 nm to about 70 nm. For example, $d(0.5)$ values of about 50 nm to about 60 nm. For example, $d(0.5)$ values of about 50 nm.

The solid catalyst employed in the process of the present invention comprises a non-oxygenated ceramic. In one embodiment, the solid catalyst comprises one or more non-oxygenated ceramic. In another embodiment, the solid catalyst comprises only one non-oxygenated ceramic.

Suitable non-oxygenated ceramics typically have high thermal conductivity, mechanical strength and good dielectric properties.

In one embodiment, the non-oxygenated ceramic is a carbide or a nitride, suitably a carbide.

In one embodiment, the non-oxygenated ceramic is selected from one or more of silicon carbide, boron carbide, tungsten carbide, zirconium carbide, aluminium carbide, aluminium nitride and silicon nitride.

In another embodiment, the non-oxygenated ceramic is selected from silicon carbide, boron carbide, tungsten carbide, zirconium carbide and aluminium carbide. Suitably, the non-oxygenated ceramic is selected from silicon carbide and silicon nitride. For instance, in one embodiment, the non-oxygenated ceramic is silicon carbide.

In one embodiment, the non-oxygenated ceramic is in monolithic form.

In one embodiment, the metal species is supported on the non-oxygenated ceramic.

In one embodiment, the catalyst, in addition to comprising one or more elements selected from Fe, Ni and Co, comprises a further metal species selected from a transition metal. Suitably, the transitional metal is in elemental form. Suitably, the elemental transition metal is selected from Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn; more suitably Fe, Ru, Os, Co, Rh, Ir, Ni, Pd, Pt and Cu; more suitably Fe, Ru, Co, Ni and Cu.

In another embodiment, the catalyst, comprises a metal species selected from elemental Fe, elemental Ni and elemental Co, and a further metal species selected from an elemental transition metal. Suitably, the elemental transition metal is selected from Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn; more suitably Fe, Ru, Os, Co, Rh, Ir, Ni, Pd, Pt and Cu; more suitably Fe, Ru, Co, Ni and Cu.

In another embodiment, the catalyst, comprises a metal species selected from elemental Fe and elemental Ni, and a further metal species selected from an elemental transition metal. Suitably, the elemental transition metal is selected from Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au and Zn; more suitably Fe, Ru, Os, Co, Rh, Ir, Ni, Pd, Pt and Cu; more suitably Fe, Ru, Co, Ni and Cu.

In another embodiment, the catalyst, comprises two metal species selected from elemental Fe, elemental Ni and elemental Co.

The solid catalyst of the process of the invention, in one embodiment comprises/essentially consists of/consists of a metal species which is a binary mixture of elemental metals selected from elemental Fe and elemental Ni (Fe/Ni), elemental Fe and elemental cobalt (Fe/Co), elemental Fe and elemental Ru (Fe/Ru), elemental Fe and elemental Cu (Fe/Cu), elemental Ni and elemental Co (Ni/Co), elemental Ni and elemental Ru (Ni/Ru); and elemental Ni and elemental Cu (Ni/Cu); and a non-oxygenated ceramic selected from silicon carbide, boron carbide, tungsten carbide, zirconium carbide, aluminium carbide, aluminium nitride and silicon nitride.

In another embodiment, the solid catalyst comprises/essentially consists of/consists of a metal species which is a binary mixture of elemental metals selected from elemental Fe and elemental Ni (Fe/Ni), elemental Fe and elemental cobalt (Fe/Co), elemental Fe and elemental Ru (Fe/Ru), elemental Fe and elemental Cu (Fe/Cu), elemental Ni and elemental Co (Ni/Co), elemental Ni and elemental Ru (Ni/Ru); and elemental Ni and elemental Cu (Ni/Cu); and a non-oxygenated ceramic selected from silicon carbide, boron carbide, tungsten carbide, zirconium carbide and aluminium carbide. Suitably, the non-oxygenated ceramic is selected from silicon carbide and silicon nitride. For instance, in one embodiment, the non-oxygenated ceramic is silicon carbide.

In one embodiment, the solid catalyst comprises/essentially consists of/consists of a metal species which is a binary mixture of elemental metals selected from elemental Fe and elemental Ni (Fe/Ni), elemental Fe and elemental cobalt (Fe/Co), elemental Fe and elemental Ru (Fe/Ru); and elemental Fe and elemental Cu (Fe/Cu); and a non-oxygenated ceramic selected from silicon carbide, boron carbide, tungsten carbide, zirconium carbide, aluminium carbide, aluminium nitride and silicon nitride.

In another embodiment, the solid catalyst comprises/essentially consists of/consists of a metal species which is a binary mixture of elemental metals selected from elemental Fe and elemental Ni (Fe/Ni), elemental Fe and elemental cobalt (Fe/Co), elemental Fe and elemental Ru (Fe/Ru); and elemental Fe and elemental Cu (Fe/Cu); and a non-oxygenated ceramic selected from silicon carbide, boron carbide, tungsten carbide, zirconium carbide and aluminium carbide. Suitably, the non-oxygenated ceramic is selected from silicon carbide and silicon nitride. For instance, in one embodiment, the non-oxygenated ceramic is silicon carbide.

In one embodiment, the solid catalyst comprises/essentially consists of/consists of elemental Fe and optionally one of elemental Ni, elemental Ru, elemental Co and elemental Cu; and a non-oxygenated ceramic selected from silicon carbide, boron carbide, tungsten carbide, zirconium carbide, aluminium carbide, aluminium nitride and silicon nitride.

In another embodiment, the solid catalyst comprises/essentially consists of/consists of elemental Fe and optionally one of elemental Ni, elemental Ru, elemental Co and elemental Cu; and a non-oxygenated ceramic selected from silicon carbide, boron carbide, tungsten carbide, zirconium carbide and aluminium carbide. Suitably, the non-oxygenated ceramic is selected from silicon carbide and silicon nitride. For instance, in one embodiment, the non-oxygenated ceramic is silicon carbide.

In one embodiment, the solid catalyst comprises/essentially consists of/consists of elemental Fe supported on silicon carbide. Suitably, the elemental Fe is present in about 1 to about 10 wt. % of the catalyst, suitably about 1 to about 5 wt. % of the catalyst, more suitably about 5 wt. %.

In one embodiment, the solid catalyst comprises/essentially consists of/consists of elemental Ni supported on silicon carbide. Suitably, the elemental Ni is present in about 1 to about 10 wt. % of the catalyst, suitably about 1 to about 5 wt. % of the catalyst, more suitably about 5 wt. %.

In one embodiment, the solid catalyst comprises/essentially consists of/consists of elemental Fe and elemental Ni supported on silicon carbide, suitably elemental Fe and Ni are present in a ratio of from about 1:5 to about 5:1, more suitably about 1:1.

In another embodiment, the catalyst comprises/essentially consists of/consists of an alloy of elemental Fe and elemental Ni supported on silicon carbide.

Typically, in the solid catalyst, the metal species is present in an amount of from 0.1 to 99 weight %, based on the total weight of the catalyst. It may for instance be present in an amount of from 0.5 to 80 weight %, based on the total weight of the catalyst. It may however be present in an amount of from 0.5 to 25 weight %, more typically from 0.5 to 40 weight % or, for instance from 1 to 30 weight %, based on the total weight of the catalyst.

The metal species may for instance be present in an amount of from 0.1 to 90 weight %, for instance from 0.1 to 10 weight %, or, for instance from 20 to 70 weight %, based on the total weight of the catalyst.

The metal species may for instance be present in an amount of from 1 to 20 weight %, for instance from 1 to 15 weight 53%, or, for example from 2 to 12 weight %, based on the total weight of the catalyst.

In one embodiment, the solid catalyst has a metal species loading of up to about 50 wt %.

In another embodiment, the solid catalyst has a metal species loading of from about 0.1 wt % to about 50 wt. %, for instance from about 1 wt % to about 20 wt. %; for instance, about from about 1 wt % to about 15 wt %; for instance from about 1 wt % to about 10 wt. %; for instance, from about 2 wt. % to about 5 wt. %.

In another embodiment, the solid catalyst has a metal species loading of about 5 wt %.

In one embodiment, the solid catalyst is selected from 5 wt. % Fe/SiC, 5 wt. % Ni/SiC, and 5 wt. %, 5 wt. % FeNi/SiC (1:1).

Heterogeneous Mixture

In another aspect, the present invention provides a heterogeneous mixture comprising a solid catalyst in intimate mixture with a composition comprising a hydrocarbon wherein the catalyst comprises:

at least one metal species, comprising one or more elements selected from Fe, Ni and Co; and
    a non-oxygenated ceramic.

In another aspect, the present invention provides a heterogeneous mixture comprising a solid catalyst in intimate mixture with a liquid composition comprising a hydrocarbon wherein the catalyst comprises:

at least one metal species, comprising one or more elements selected from Fe, Ni and Co; and
    a non-oxygenated ceramic.

With respect to the solid catalyst, composition and the features thereof, each of the above described embodiments are equally applicable to this aspect of the invention.

The present invention further relates to the use of the above described heterogeneous mixture to produce hydrogen.

This can be achieved by exposing the heterogeneous mixture to electromagnetic radiation as described above.

Microwave Reactor

In another aspect, the present invention relates to a microwave reactor comprising a heterogeneous mixture, said mixture comprising a solid catalyst in intimate mixture with a composition comprising a hydrocarbon wherein the catalyst comprises:

at least one metal species, comprising one or more elements selected from Fe, Ni and Co; and
    a non-oxygenated ceramic.

In another aspect, the present invention relates to a microwave reactor comprising a heterogeneous mixture, said mixture comprising a solid catalyst in intimate mixture with a liquid composition comprising a hydrocarbon wherein the catalyst comprises:

at least one metal species, comprising one or more elements selected from Fe, Ni and Co; and
    a non-oxygenated ceramic.

With respect to the solid catalyst, composition and the features thereof, each of the above described embodiments are equally applicable to this aspect of the invention.

Typically, the reactor is configured to receive the composition to be exposed to radiation. The reactor typically therefore comprises at least one vessel configured to comprise the composition. The composition may have been provided via an inlet to the vessel. The vessel may be located in a reaction cavity, said cavity being the focus of the microwave radiation.

The reactor is also configured to export hydrogen. Thus, the reactor typically comprises an outlet through which hydrogen gas, generated in accordance with the process of the invention, may be released or collected.

In some embodiments, the microwave reactor is configured to subject the composition to electric fields in the TM010 mode.

Fuel Cell Module

In a another aspect, the present invention provides a fuel cell module comprising a (i) a fuel cell and (ii) a heterogeneous mixture comprising a solid catalyst in intimate mixture with a composition comprising a hydrocarbon wherein the catalyst comprises:

at least one metal species, comprising one or more elements selected from Fe, Ni and Co; and
    a non-oxygenated ceramic.

In a another aspect, the present invention provides a fuel cell module comprising a (i) a fuel cell and (ii) a heterogeneous mixture comprising a solid catalyst in intimate mixture with a liquid composition comprising a hydrocarbon wherein the catalyst comprises:

at least one metal species, comprising one or more elements selected from Fe, Ni and Co; and
    a non-oxygenated ceramic.

Fuel cells, such as proton exchange membrane fuel cells, are well known in the art and thus readily available to the skilled person.

In one embodiment, the fuel cell module may further comprise (iii) a source of electromagnetic radiation. Suitably, the source of electromagnetic radiation is suitable for exposing the composition to electromagnetic radiation and thereby effecting decomposition of the composition or a component thereof to produce hydrogen. Said decomposition may be catalytic decomposition. The source of electromagnetic radiation may be as described in any of the embodiments above.

Suitably, the electromagnetic radiation is microwave radiation and the source of the microwave radiation is a microwave reactor, suitable as described above.

Vehicle

In another aspect, the present invention provides a vehicle comprising a microwave reactor according to invention.

In another aspect, the present invention provides a vehicle or an electric device comprising a fuel cell module according to invention.

EXAMPLES

Materials and Methods

1. Preparation of the Catalysts

The catalysts were prepared by an impregnation method. SiC (Silicon Carbide, Fisher Scientific), AC (Activated Carbon, Sigma-Aldrich), $SiO_2$ (Silica mesoporous, Sigma-Aldrich) were used as the catalytic supports. Metal nitrate, such as $Fe(NO_3)_3 \cdot 9H_2O$ (Iron (Ill) nitrate nonahydrate, Sigma-Aldrich), was used as metal precursor. For preparing SiC supported iron catalysts, impregnation was performed by stirring the mixture of the support powders and $Fe(NO_3)_3 \cdot 9H_2O$ solution at 150° C. on a magnetic hot plate in a fume hood for 3 h until it became a slurry. The slurry then was moved into the drying oven, for drying overnight. The resulting solid mixtures were calcined in a furnace at 350° C. for 3 h. In this way, $Fe(NO_3)_3$ decomposed into $Fe_2O_3$. Finally, the active catalysts were obtained by a reduction process in 10% $H_2$/argon gases at 800° C. for 6 h.

The same method was used to prepare other catalysts with different supporting materials and metals. For the preparation of binary metal catalyst, the metal precursors were first mixed in distilled water and then blended with support powders.

II. Characterisation of Catalysts

The catalysts were characterised by powder X-ray diffraction (XRD) using a Cu Kα X-ray source (45 kV, 40 mA) on a PANalytical X'Pert PRO diffractometer. The scanning range (in 2θ) in this study was 10° to 80°.

The surface morphology of the prepared catalysts was characterised by Scanning Electron Microscope (SEM, JEOL 840F).

Thermogravimetric Analysis (TGA, TA Instrument, SDT Q-600) was used to characterise the feedstocks remaining and the resulting carbon residue in spent samples. The TGA of spent catalysts were first carried out in an $N_2$ atmosphere to test the hexadecane remaining, the atmosphere then changed to air to analyse the carbon residue on spent catalysts.

The carbon on spent catalysts were also confirmed via Laser-Raman spectroscopy (PerkinElmer RamanStation™ 400F spectrometer), where laser excitation is at 785 nm.

III. Dehydrogenation of Liquid Hydrocarbons Under Microwave Radiation

FIG. 1 shows the experimental setup which consists of a microwave generation system, a purpose-built microwave cavity and a control system. The catalyst was first placed in a quartz tube (inner diameter 6 mm, outer diameter 9 mm), the height of the catalyst bed exposed to the axially polarised (TM$_{010}$) uniform electric fields is 4 cm. Liquid hydrocarbons (a commercial hexadecane (SIGMA-ALDRICH) and diesel etc.) were then injected into tube as 30% by weight of catalysts, waiting 5-10 min until the hydrocarbon was well dispersed into catalyst bed. Then, the filled tube was placed axially in the centre of the TM$_{010}$ microwave cavity in order to minimise depolarisation effects under microwave radiation. Before starting microwave irradiation, the samples were purged with argon for 5-10 min. Then, the sample was irradiated with microwaves for 30 min at 750 W. The microwave system is not impedance matched, thus the energy delivered to the sample cavity and the microwave power to which the sample was exposed was significantly less than this value. The generated gases were collected and analysed by Gas Chromatography (GC).

IV. Microwave Cavity Perturbation Measurements

Figure 2A:
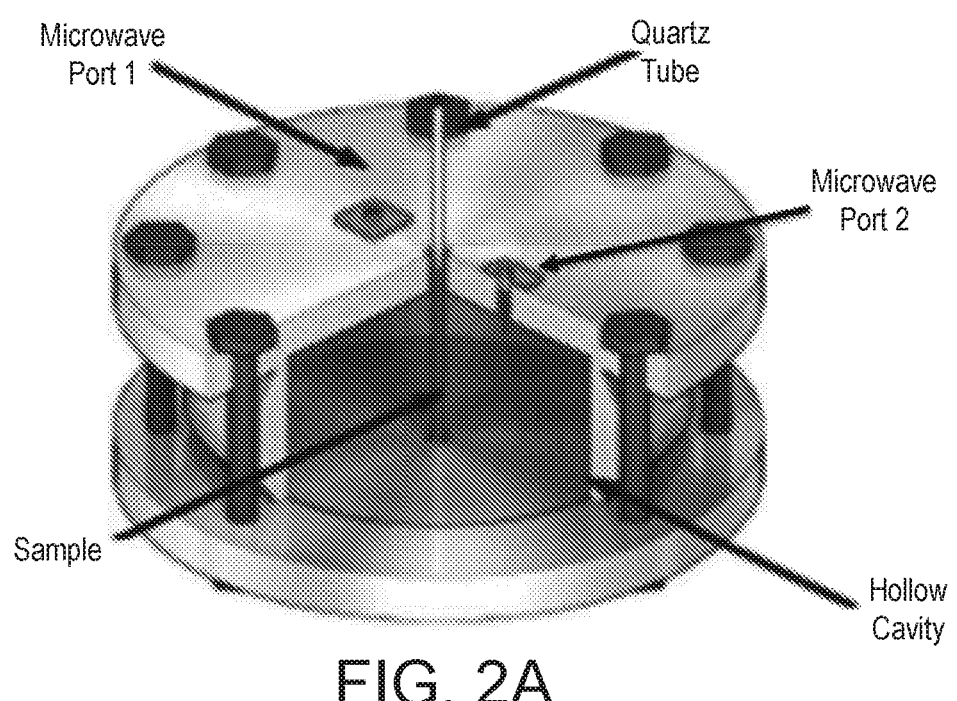
FIG. 2a shows a quarter section of a perturbation cavity, cut to show the location of the sample tube.
Figure 2B:
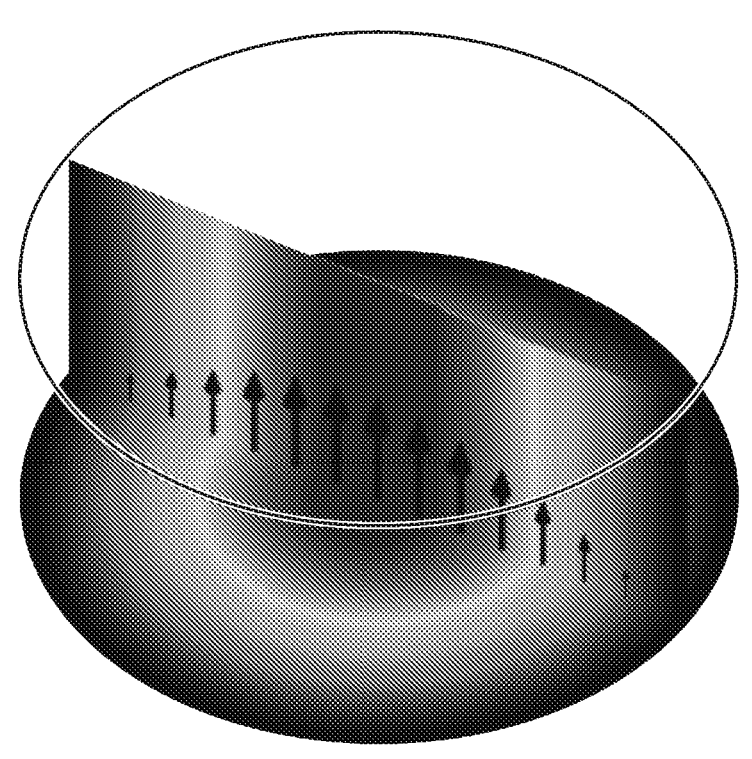
FIG. 2b shows a finite element model of the $TM_{010}$ electric field distribution in the cylindrical cavity. High fields are shown in red and by the larger arrows.

The perturbation cavity (shown in FIG. 2) used in the experiments uses the Transverse Magnetic TM$_{010}$ mode. The TM$_{010}$ mode within a waveguide has a highly uniform electric field that only varies radially within the cavity. The microwaves are coupled to the cavity using coaxial cables placed at Port 1 and Port 2 and terminated with an open circuit extended centre conductor oriented to provide capacitive coupling to the electric fields of the TM$_{010}$ mode at radial positions 3 cm from the axis. A quartz tube (inner diameter 2 mm, outer diameter 4 mm) is used as a container due to its high microwave transparency. And the sample is placed into the quartz tube and placed in the centre of the cavity, at the maximum of a standing wave. All microwave measurements are performed using an Agilent E5071B network analyser. Measurements are performed of the transmitted microwave power $|S_{21}|^2$ in the frequency domain. The effects of cavity couplings are removed by converting the loaded quality factor $Q_L$ into the unloaded quality factor Q in each case. The cavity couplings are adjusted so that they are equal (i.e., symmetric) and so the conversion is made using the simple formula $Q=Q_L(1-10^{-IL/20})$, where IL is the insertion loss (i.e., transmitted power) at resonance, measured in dB (1).

Investigation of Catalyst Performance of Hydrogen Production

Hexadecane ($C_{16}H_{34}$) was chosen to simulate diesel and the experiments were carried out over SiC supported catalysts under microwave irradiation. Resulting gas and liquid samples were collected and analysed by GC and MS.

Table 1 shows that evolved gas distributions (% vol. of total vol. % of gas emitted) by GC analysis when hexadecane (0.5 ml) was impregnated into the catalysts and the heterogeneous mixture irradiated with microwaves (750 VW) for 30 minutes.

TABLE 1

| Sample(*) | H$_2$ [Vol %] | Methane [Vol %] | Ethylene [Vol %] | other light hydro-carbons [Vol %] | CO$_2$ [Vol %] | CO [Vol %] |
|---|---|---|---|---|---|---|
| Fe | 72.21 | 4.66 | 7.99 | 3.54 | 1.51 | 10.10 |
| SiC | | | N/A | | | |
| AC | 58.66 | 24.14 | 10.37 | 5.17 | 0.58 | 1.09 |
| SiO$_2$ | | | N/A | | | |
| Fe/SiC | 93.13 | 2.16 | 0.68 | 0.61 | 0.20 | 3.20 |
| Fe/AC | 56.03 | 18.62 | 10.25 | 7.05 | 0.26 | 7.80 |
| Fe/SiO$_2$ | 60.70 | 11.58 | 8.75 | 1.74 | 0.30 | 16.93 |
| Fe/SiC(5) | 93.13 | 2.16 | 0.68 | 0.61 | 0.2 | 3.2 |
| Ni/SiC (5) | 96.60 | 1.39 | 0.13 | 0.07 | 0.1 | 1.7 |
| Co/SiC (5) | 73.85 | 11.15 | 9.67 | 4.81 | 0.0 | 0.5 |
| Ru/SiC (2) | | | N/A | | | |
| Fe—Ni/SiC (4.5, 0.5) | 96.00 | 3.15 | 0.14 | 0.31 | 0.0 | 0.4 |
| Fe—Co/SiC (4.5, 0.5) | 93.18 | 4.72 | 0.54 | 0.97 | 0.0 | 0.6 |
| Fe—Ru/SiC (4.5, 0.5) | 93.02 | 3.48 | 0.81 | 0.80 | 0.1 | 1.8 |
| Fe—Cu/SiC (4.5, 0.5) | 93.53 | 2.95 | 0.76 | 0.87 | 0.0 | 1.9 |
| Fe/SiC(5) | 93.13 | 2.16 | 0.68 | 0.61 | 0.2 | 3.2 |
| Fe/SiC(10) | 92.41 | 2.56 | 0.67 | 0.56 | 0.1 | 3.7 |
| Fe—Ni/SiC (5, 1) | 97.47 | 1.80 | 0.10 | 0.15 | 0.2 | 0.3 |
| Fe—Ni/SiC (5, 5) | 97.72 | 1.63 | 0.05 | 0.05 | 0.0 | 0.5 |
| Fe—Ni/SiC (1, 5) | 94.45 | 3.34 | 0.22 | 0.13 | 0.1 | 1.8 |
| Ni/SiC (5) | 96.60 | 1.39 | 0.13 | 0.07 | 0.1 | 1.7 |
| Ni/SiC (10) | 94.52 | 4.32 | 0.28 | 0.57 | 0.1 | 0.2 |
| Fe/SiC (0) | | | N/A | | | |
| Fe/SiC (2) | 92.14 | 3.07 | 1.37 | 1.16 | 0.07 | 2.21 |
| Fe/SiC (5) | 93.13 | 2.16 | 0.68 | 0.61 | 0.18 | 3.24 |
| Fe/SiC (10) | 92.41 | 2.56 | 0.67 | 0.56 | 0.14 | 3.66 |
| Fe/SiC (20) | 85.35 | 4.69 | 2.64 | 1.79 | 0.19 | 5.34 |
| Fe/SiC (100) | 70.60 | 4.76 | 8.15 | 3.57 | 2.73 | 10.19 |

*: catalyst (metal content);
'N/A' means no reaction was found on catalyst during the experiment.

Figure 3A:
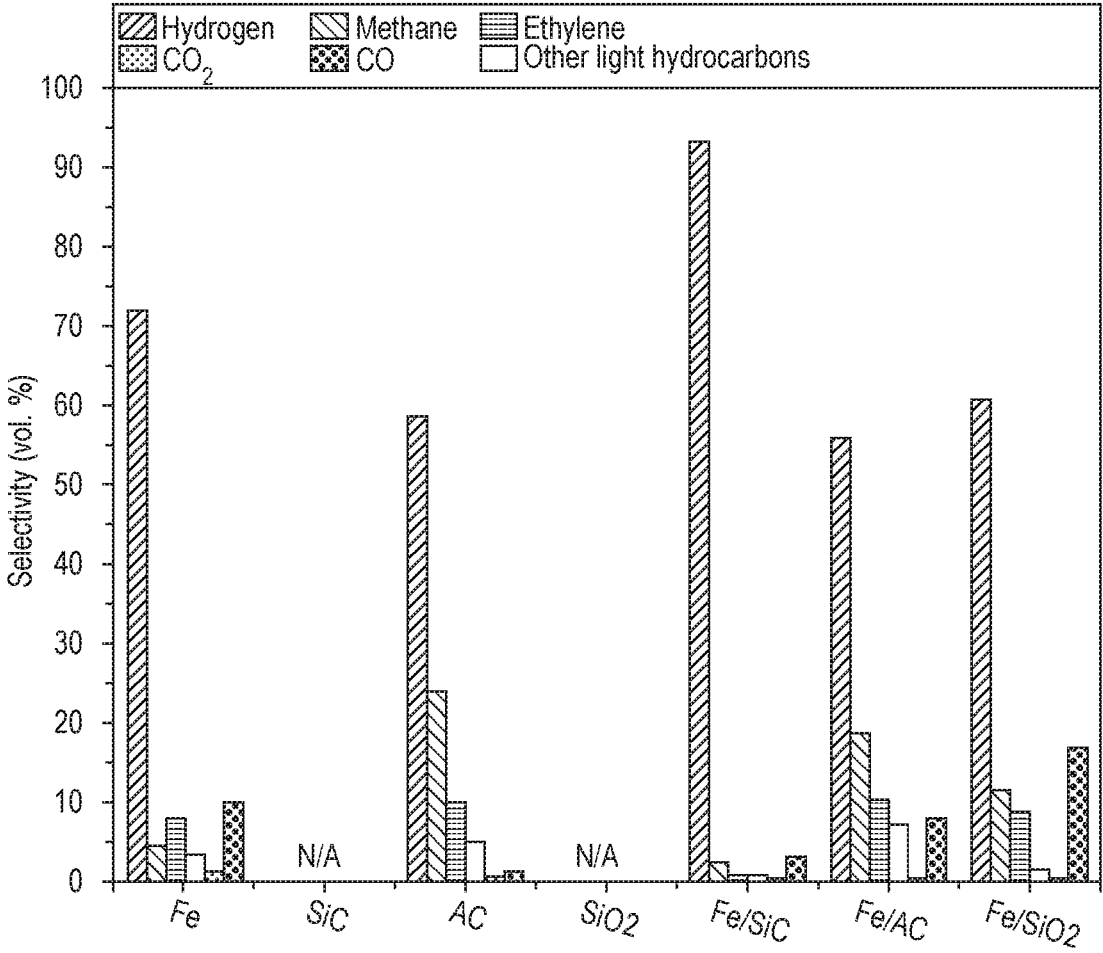
FIG. 3 (a) shows the effect of different catalyst supporting materials; (b) shows the effect of different catalyst metals; (c) shows product selectivity of binary metal catalysts; (d) shows the product selectivity of Fe/SiC catalysts with various iron contents. Figures in parenthesis indicate weight percentage of metal loading. 'N/A' means no reaction was found under microwave treatment; (e) shows the evolved gas distributions (vol. %) for 5 wt. % Fe/SiC and 5/5 wt % Fe—Ni/SiC catalysts assessed from various liquid feedstocks, including saturated hydrocarbons (C9-C17), diesel fuel, methanol and ethanol.

A clear difference is found in supporting materials that contain only activated carbon (AC) which can catalyse the reactions under microwave conditions without metals albeit less efficiently (FIG. 3a). The performance of silicon carbide (SiC) and silica (SiO$_2$) was significantly changed when metals were loaded. A remarkably high hydrogen selectivity (ca. 93 vol. %) was obtained when iron was loaded on SiC. In contrast higher amounts of methane and carbon monoxide were generated on Fe/AC and Fe/SiO$_2$ catalysts.

Figure 3B:
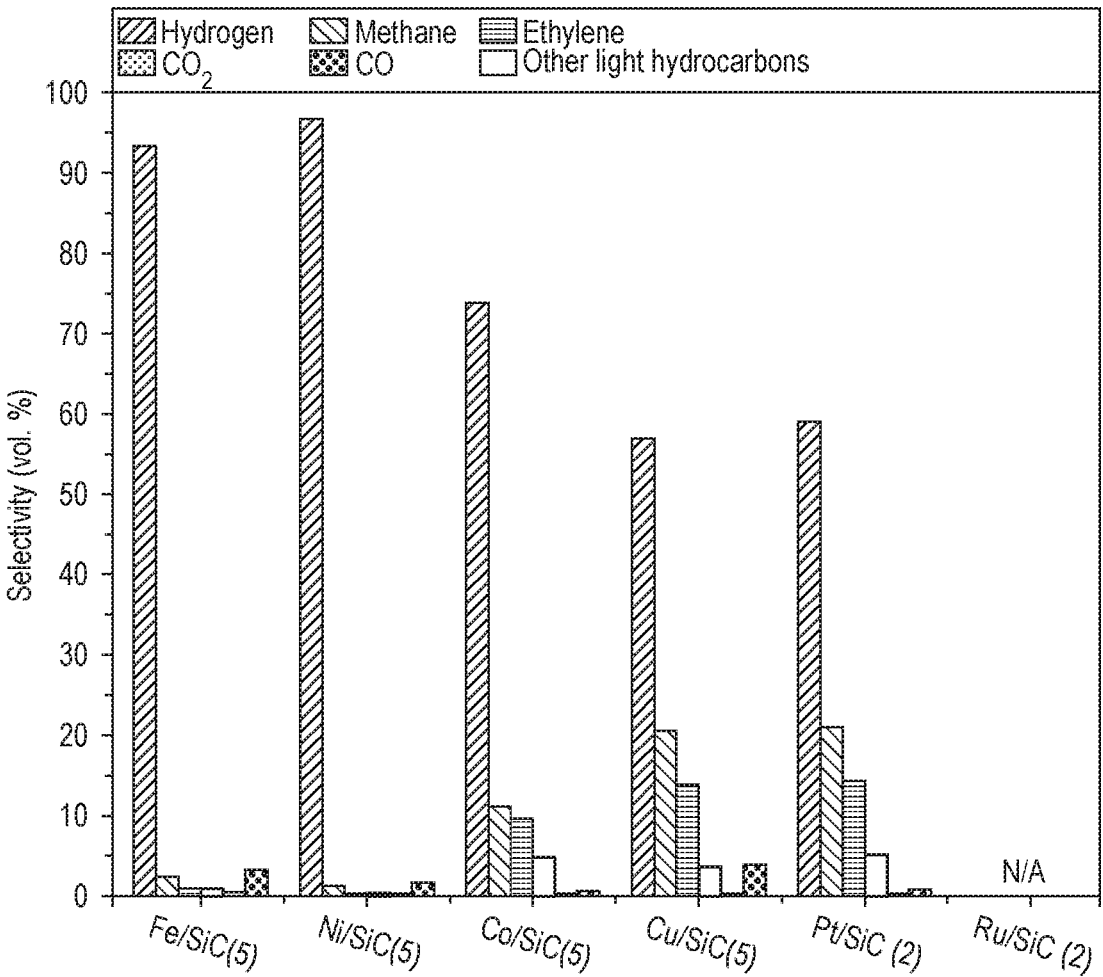

Different metals supported by SiC exhibited varying levels of performance under microwave irradiation with different product distributions (FIG. 3b). Extremely high hydrogen selectivity (ca. 96 vol. % and 93 vol. %) were obtained on nickel and iron respectively. While other metals (Co, Cu, Pt and Ru) showed a range of selectivity. It can be seen that the hydrogen selectivity of cobalt is ca. 74 vol. % and the levels of CO and CO$_2$ are negligible. Hydrogen selectivity was only about ca. 60 vol. % for copper and platinum.

Interestingly, no reaction was found on Ru/SiC catalysts under microwave irradiation.

Iron and nickel, showed the best response to microwave irradiation and subsequently led to the high selectivity for hydrogen.

Figure 3C:
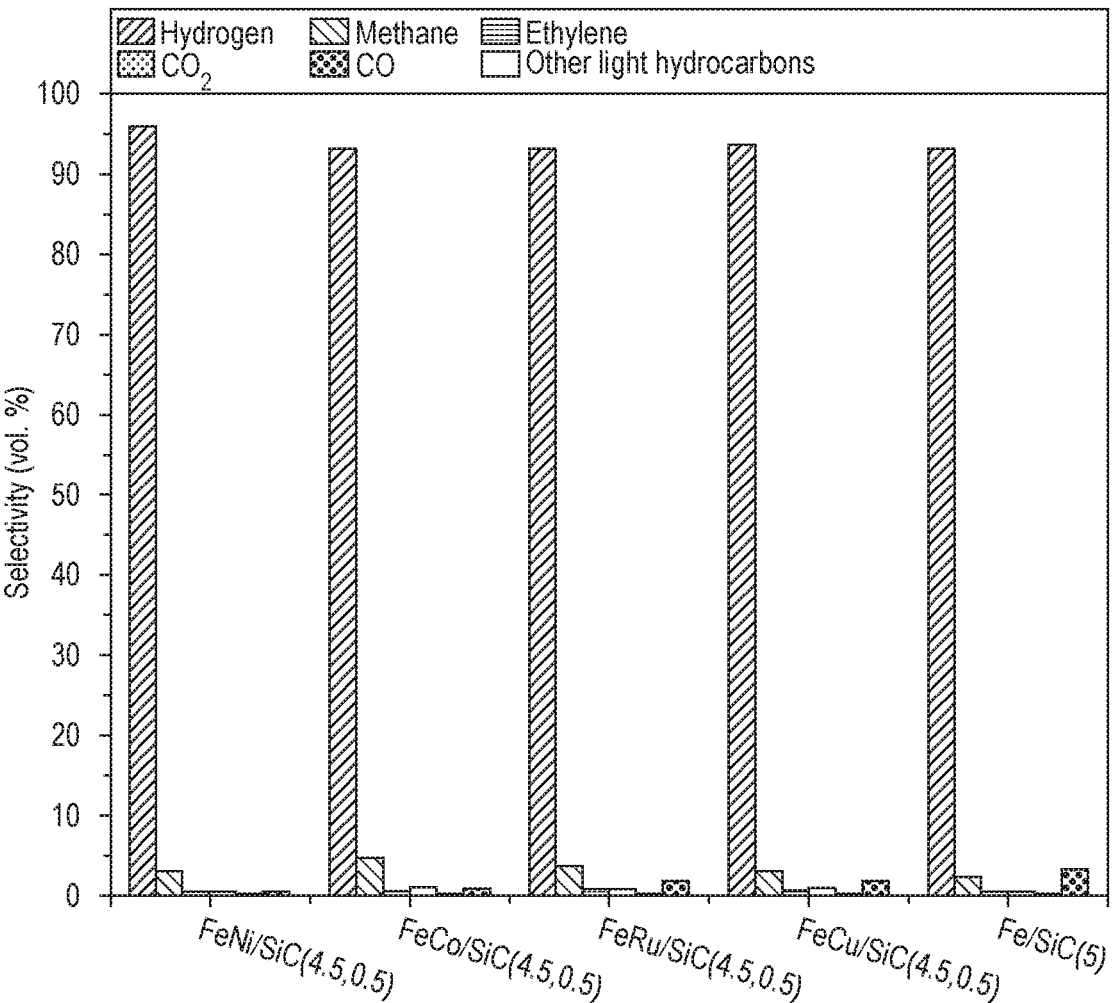

It is clear that some metals like Ni and Co have the ability to restrict the formation of CO. Accordingly, bimetallic metal catalysts (Fe—X/SiC, X=Ni, Co, Cu and Ru) were investigated. It can be seen that the amount of CO was significantly reduced when Ni and Co were present (FIG. 3c). An extremely high hydrogen selectivity of ca. 98 vol. % was obtained on the Fe—Ni/SiC catalyst and $CO_2$ formation was zero.

Figure 3D:
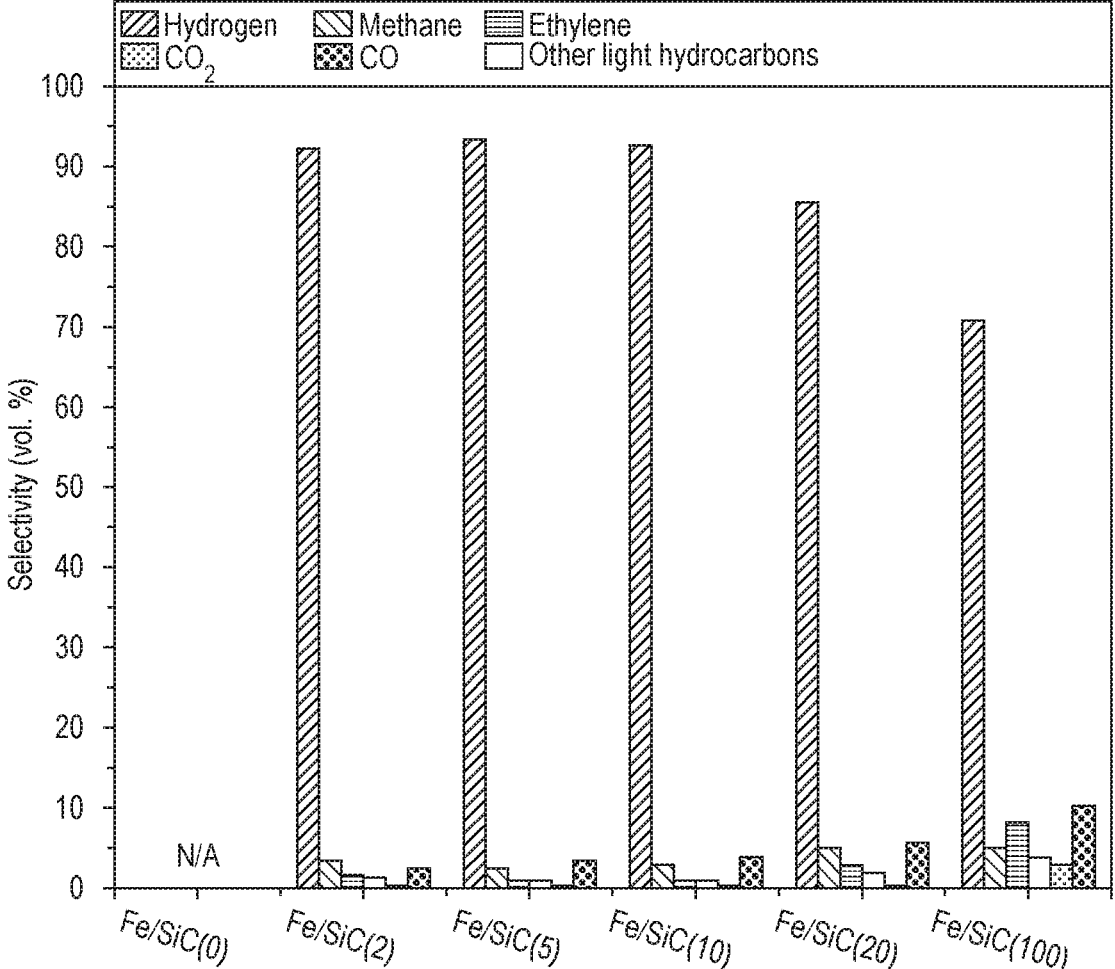

The metal content of the catalyst was investigated and it was found that the hydrogen selectivity dropped when more Fe was present in the Fe/SiC catalyst (FIG. 3d).

In contrast, the formation of CO and light alkanes and olefins are favourable at higher Fe content.

Figure 3E:
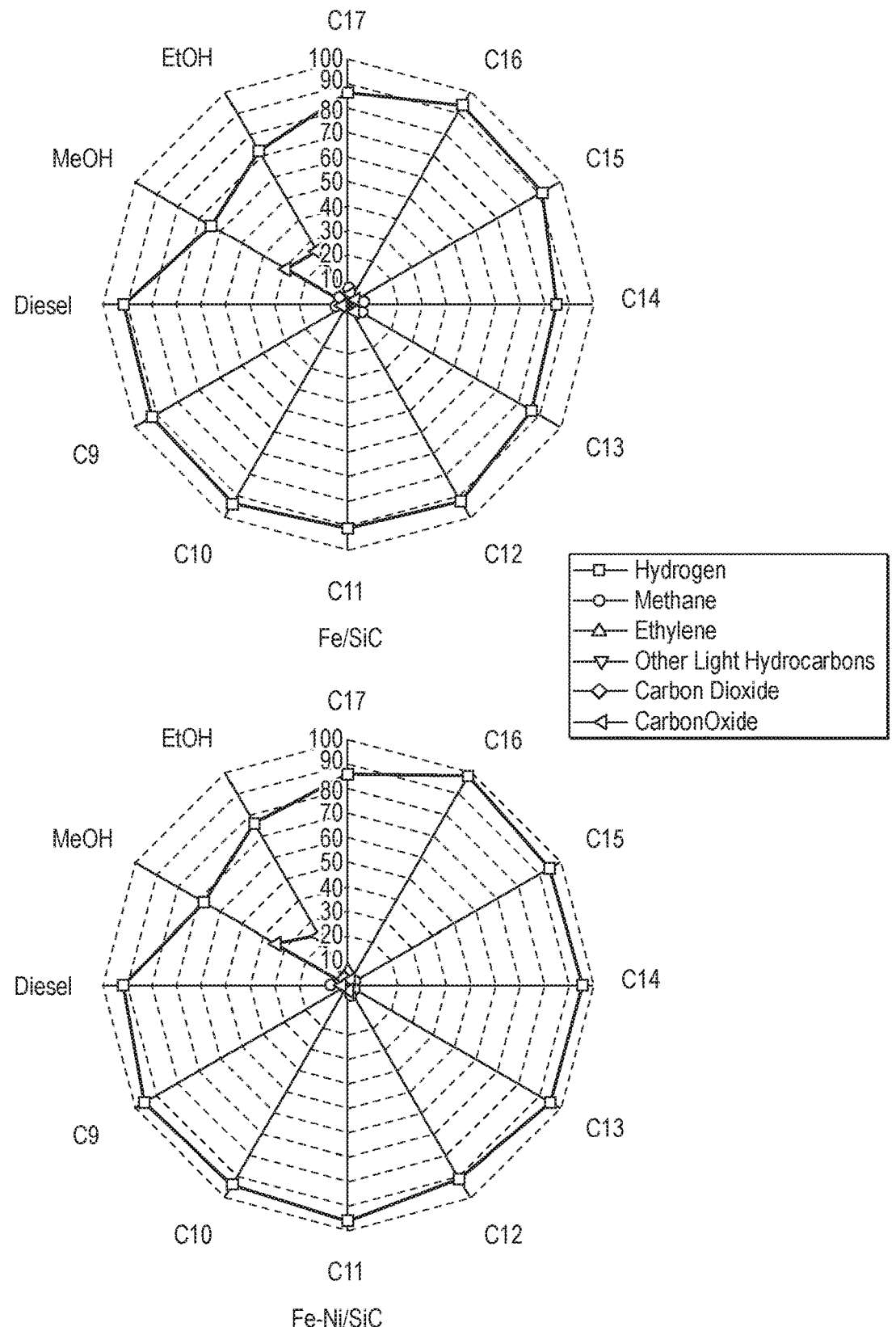

Subsequently, a broad range of liquid hydrocarbons (C9-C17), including diesel fuel, were investigated using Fe/SiC and FeNi/SiC catalysts respectively (see Tables 2 and 3, below). Similar product distributions were found among all the liquid hydrocarbons (C9-C17) where the selectivity to hydrogen is >90 vol. % (FIG. 3e). The results illustrate that this approach can be applied to a broad range of liquid hydrocarbon feedstocks.

Evolved gas distributions by GC analysis when Fe/SiC was impregnated with various feeds and the heterogeneous mixture irradiated with microwaves (750 VV) for 30 minutes.

TABLE 2

| Sample* | $H_2$ [Vol %] | Methane [Vol %] | Ethylene [Vol %] | other light hydro-carbons [Vol %] | $CO_2$ [Vol %] | CO [Vol %] |
|---|---|---|---|---|---|---|
| $C_{17}H_{36}$ | 87.35 | 6.37 | 0.90 | 1.41 | 0.10 | 3.87 |
| $C_{16}H_{34}$ | 93.13 | 2.16 | 0.68 | 0.61 | 0.18 | 3.24 |
| $C_{15}H_{32}$ | 91.66 | 2.87 | 1.29 | 0.71 | 0.08 | 3.39 |
| $C_{14}H_{30}$ | 85.03 | 6.50 | 3.96 | 2.40 | 0.07 | 2.03 |
| $C_{13}H_{28}$ | 86.46 | 7.13 | 1.84 | 1.74 | 0.05 | 2.79 |
| $C_{12}H_{26}$ | 92.66 | 1.31 | 0.68 | 0.41 | 0.11 | 4.82 |
| $C_{11}H_{24}$ | 91.40 | 3.61 | 0.27 | 0.29 | 0.06 | 4.37 |
| $C_{10}H_{22}$ | 94.11 | 2.57 | 0.39 | 0.37 | 0.07 | 2.49 |
| $C_9H_{20}$ | 92.79 | 4.00 | 0.17 | 0.41 | 0.05 | 2.57 |
| Methanol | 63.99 | 4.74 | 0.04 | 0.05 | 1.95 | 29.22 |
| Ethanol | 72.48 | 1.30 | 0.38 | 0.77 | 0.50 | 24.57 |

Evolved gas distributions by GC analysis when FeNi/SiC was impregnated with various feeds and the heterogeneous mixture irradiated with microwaves (750 W) for 30 minutes.

TABLE 3

| Sample* | $H_2$ [Vol %] | Methane [Vol %] | Ethylene [Vol %] | other light hydro-carbons [Vol %] | $CO_2$ [Vol %] | CO [Vol %] |
|---|---|---|---|---|---|---|
| $C_{17}H_{36}$ | 85.00 | 6.37 | 4.65 | 3.43 | 0.07 | 0.49 |
| $C_{16}H_{34}$ | 97.72 | 1.63 | 0.05 | 0.05 | 0.00 | 0.50 |
| $C_{15}H_{32}$ | 93.96 | 3.59 | 0.69 | 0.40 | 0.05 | 1.31 |
| $C_{14}H_{30}$ | 95.95 | 3.10 | 0.25 | 0.27 | 0.05 | 0.38 |
| $C_{13}H_{28}$ | 95.29 | 3.20 | 0.26 | 0.53 | 0.05 | 0.66 |
| $C_{12}H_{26}$ | 90.85 | 5.25 | 1.54 | 1.73 | 0.04 | 0.61 |
| $C_{11}H_{24}$ | 96.37 | 2.59 | 0.14 | 0.47 | 0.04 | 0.39 |
| $C_{10}H_{22}$ | 93.46 | 2.62 | 0.88 | 0.32 | 0.14 | 2.58 |
| $C_9H_{20}$ | 94.80 | 2.00 | 0.31 | 0.19 | 0.07 | 2.63 |
| Methanol | 66.21 | 0.40 | 0.04 | 0.02 | 0.52 | 32.80 |
| Ethanol | 75.00 | 1.23 | 0.29 | 0.07 | 0.62 | 22.80 |

Analysis of the Catalysts Before and After Reaction
V. X-Ray Diffraction (XRD)

Figure 4:
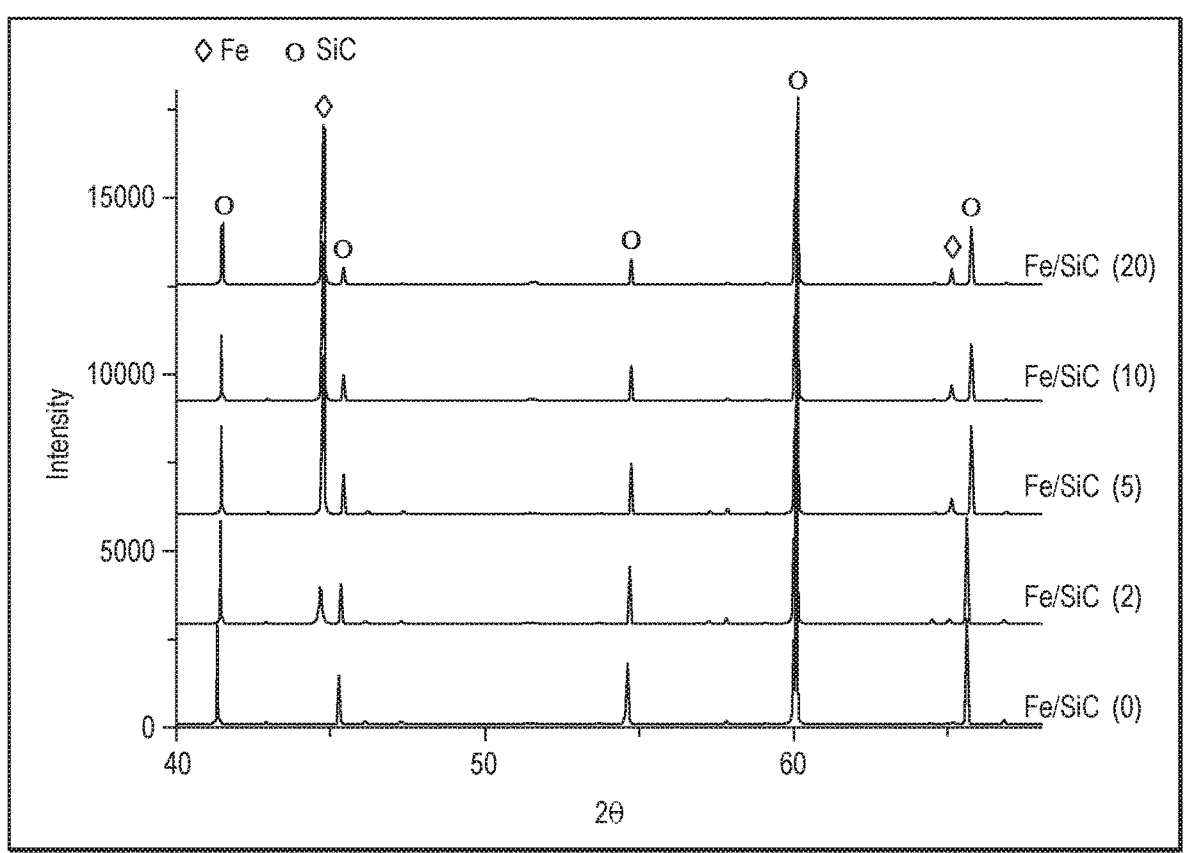
FIG. 4 shows XRD patterns of fresh Fe/SiC catalysts, $2\theta=40°-68°$. Figures in parenthesis indicate weight percentage of metal content in the catalyst.
Figure 5:
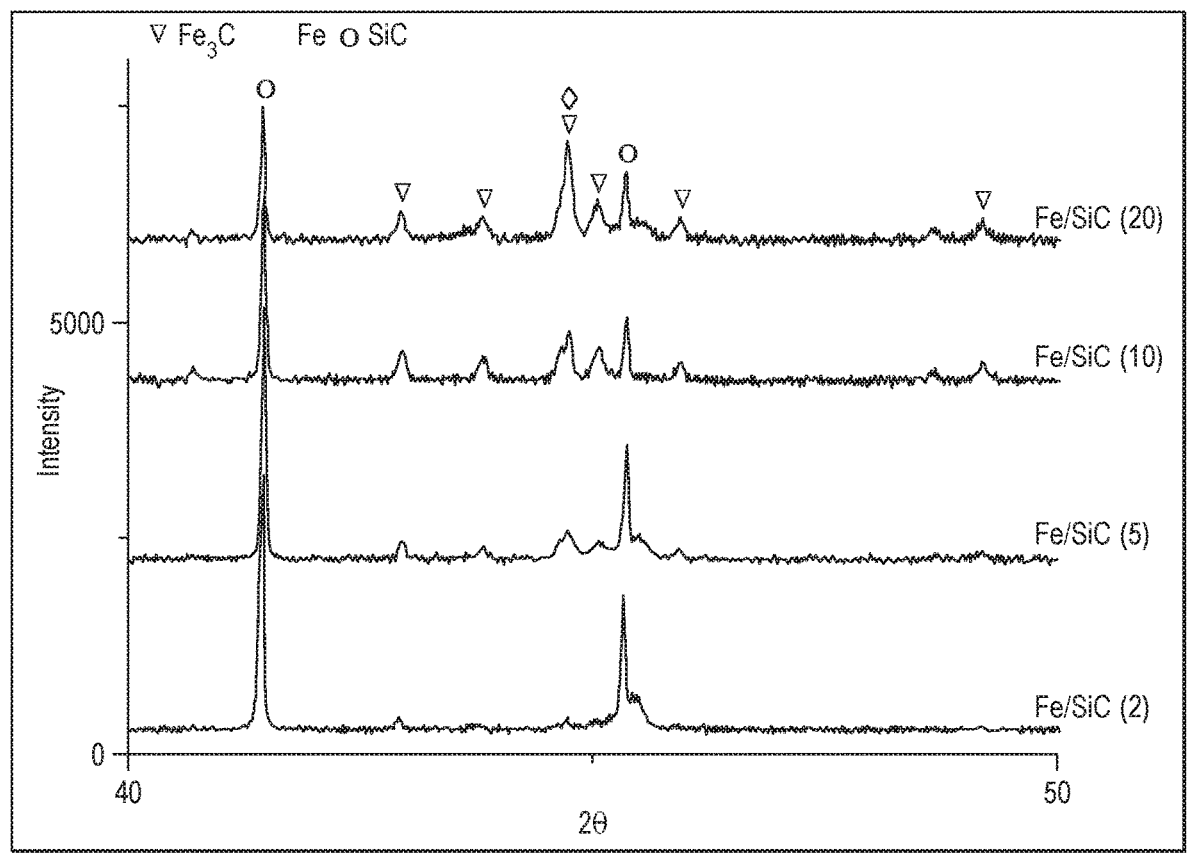
FIG. 5 shows XRD patterns of spent Fe/SiC catalysts, $2\theta=40°-50°$. Figures in parenthesis indicate weight percentage of metal content in the catalyst.

The catalysts were characterised before and after microwave treatment by X-ray diffraction (XRD). FIG. 4 and FIG. 5 illustrate the XRD pattern of Fe/SiC catalysts with different iron content. In FIG. 4 the characteristic peaks of iron and silicon carbide was observed. Silicon carbide peaks are detected at the diffractions peaks of 2θ=41.51°, 45.4°, 54.73°, 60.12°, and 65.73°. The peak of iron at 44.79° and 65.11° was detected which corresponds to the 110 and 200 lattice planes of iron, respectively. It is clear that the peak intensity of iron became stronger when Fe loading increased from 2 to 20 wt. %.

In the pattern of spent catalysts (FIG. 5), the peak of iron dramatically decreases or disappears and the characteristic peaks of iron carbide at the diffractions peaks of 2θ=42.92°, 43.82°, 44.72°, 45.04°, 45.9°, and 49.18° are detected. The SiC peak has no changes which indicate the SiC supports are stable under the reaction conditions (FIG. 5).

Figure 6:
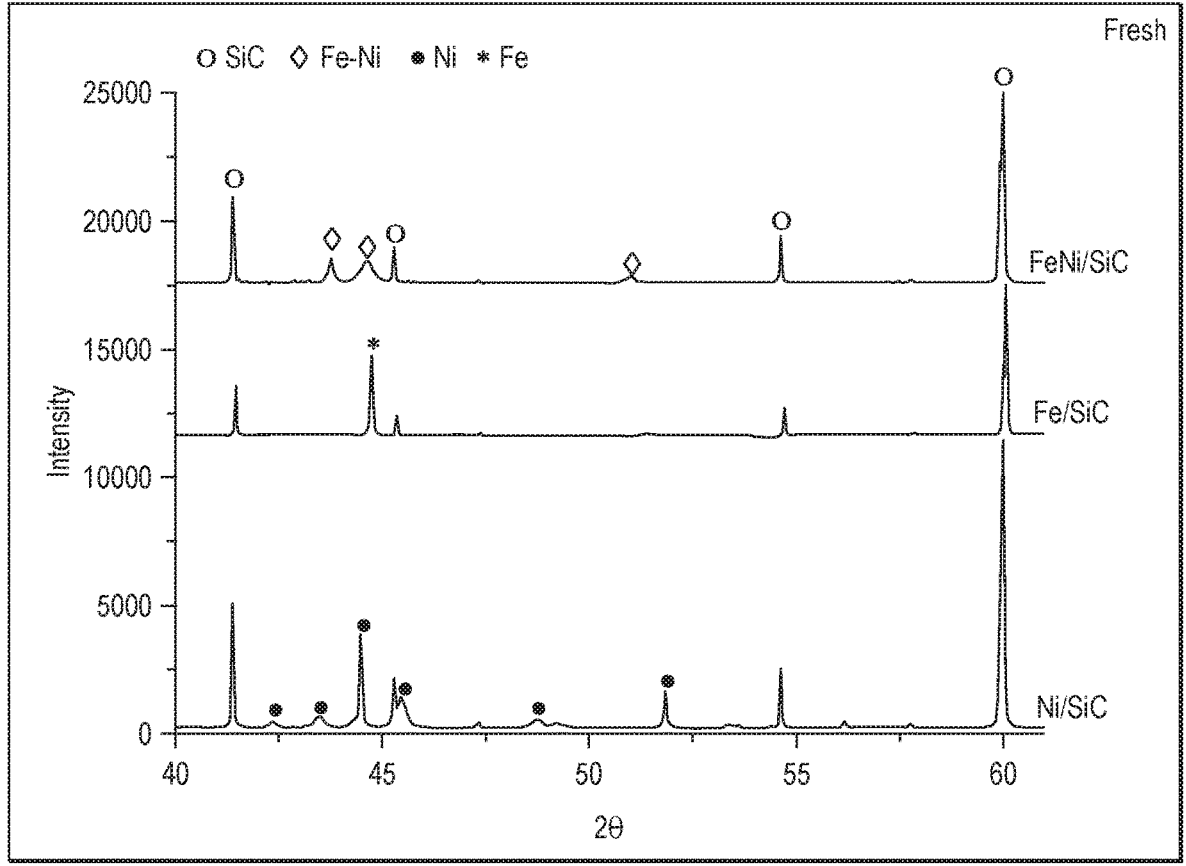
FIG. 6 shows an XRD pattern comparison on fresh Fe/SiC, Ni/SiC, and Fe—Ni/SiC catalysts, $2\theta=40°-50$.

Powder XRD studies on fresh Fe/SiC, Ni/SiC, and FeNi/SiC catalysts were performed and the results are shown in FIG. 6. As expected, the Fe/SiC and Ni/SiC show clear sharp diffraction peaks for metallic iron and nickel. The iron peak at 44.79° was detected and the peaks at 2θ=45.50°, 53.05° corresponding to the Ni (111) and Ni (200) reflections. The specific diffraction peaks of Fe and Ni in Fe—Ni/SiC show the little shift, but no characteristic peaks can be detected indicating the $FeNi_3$ or metal oxide composition. Therefore, the Fe and Ni in Fe—Ni/SiC are considered still in metallic phase.

Figure 7:
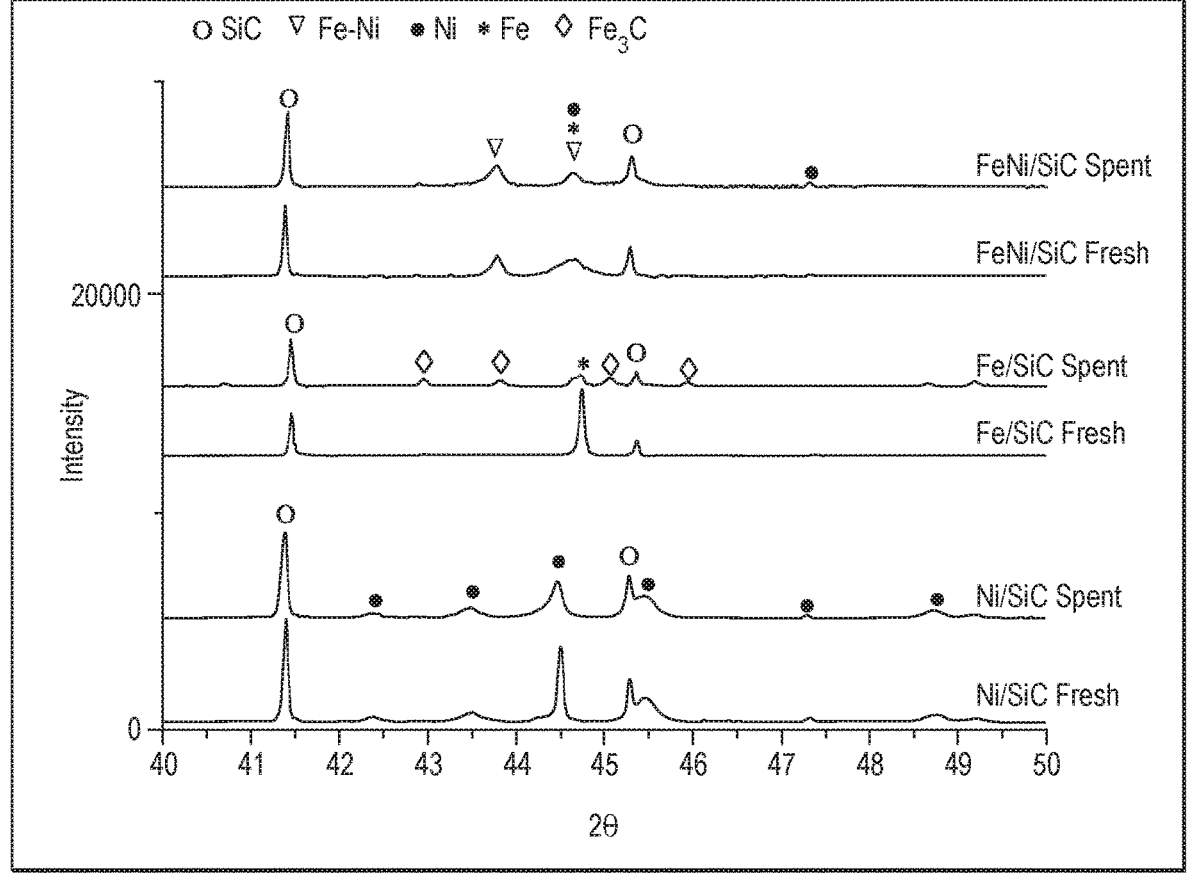
FIG. 7 shows an XRD pattern comparison of Fe/SiC, Ni/SiC, and Fe—Ni/SiC catalysts before and after reaction.

FIG. 7 illustrates the comparison of the catalysts before and after hydrogen production reactions under microwave irradiation. The structure of Ni is more stable than Fe during the reaction as the $Fe_3C$ was formed. It is clear that the stability of catalysts is improved when Ni present. Nearly no changes had been found on metal structure in Fe—Ni/SiC catalysts after the reaction.

VI. Scanning Electron Microscope (SEM)

Figure 8:
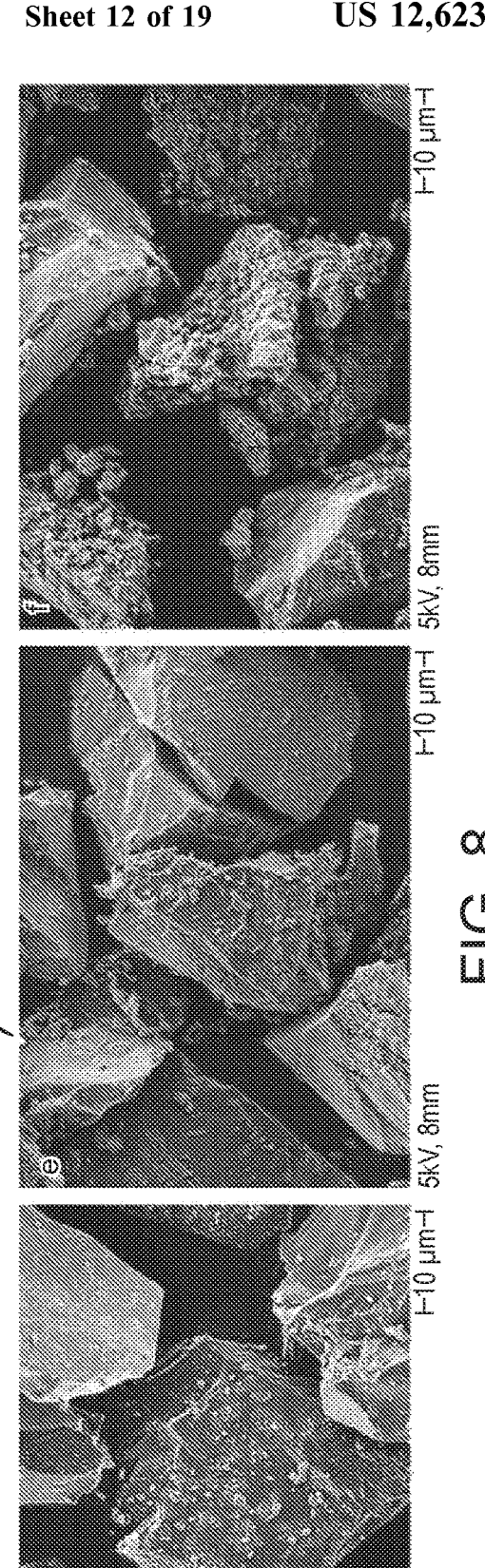
FIG. 8 shows the SEM images of fresh Fe/SiC catalysts; (a), (d): Fe/SiC (2) catalyst, (b), (e): Fe/SiC (5) catalyst, and (c), (f): Fe/SiC (20) catalyst. Figures in parenthesis indicate weight percentage of metal content in the catalyst.

The morphology of prepared catalysts was characterised on Scanning Electron Microscope (SEM). FIG. 8 shows the SEM images of fresh Fe/SiC catalysts with different iron loadings. The size of silicon carbide is ca. 20-40 μm and the size of iron particles is various, range at 0.01-1 μm. The iron can be found on the surface of silicon carbide, but is not uniform. A comparably larger iron particle can be observed in higher Fe containing samples.

Figure 9:
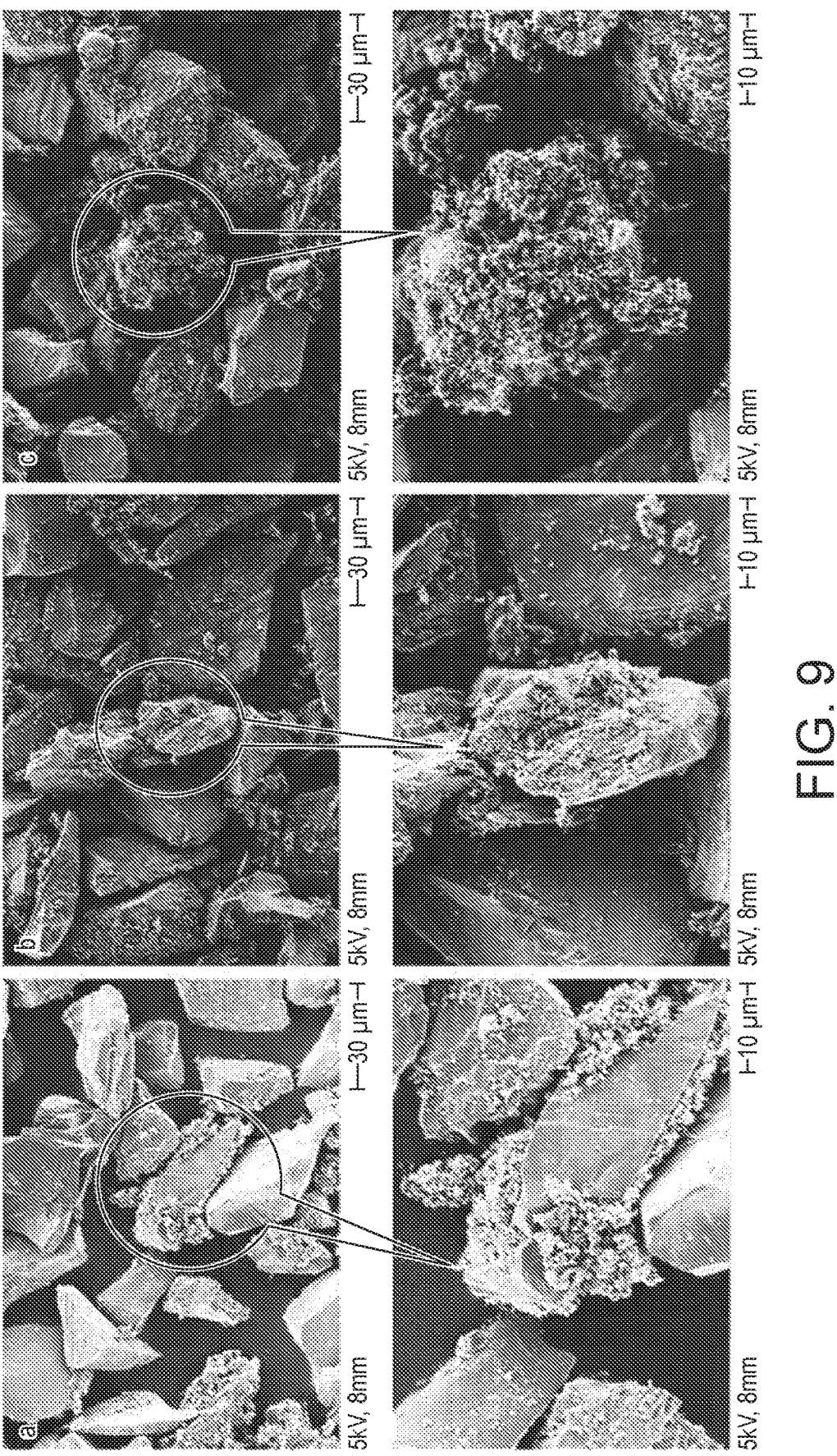
FIG. 9 shows the SEM images of the spent Fe/SiC catalysts; (a) Fe/SiC (2) catalyst, (b) Fe/SiC (5) catalyst, and (c) Fe/SiC (20) catalyst. Figures in parenthesis indicate weight percentage of metal content in the catalyst.

The SEM image of spent Fe/SiC catalysts is given in FIG. 9. The parent agglomeration can be found over iron particles on SiC support surface and the size of these clusters are approximately 10 μm. Some filamentous products were discovered twining on the clusters at a higher iron content catalyst (FIG. 9c).

Figure 10:
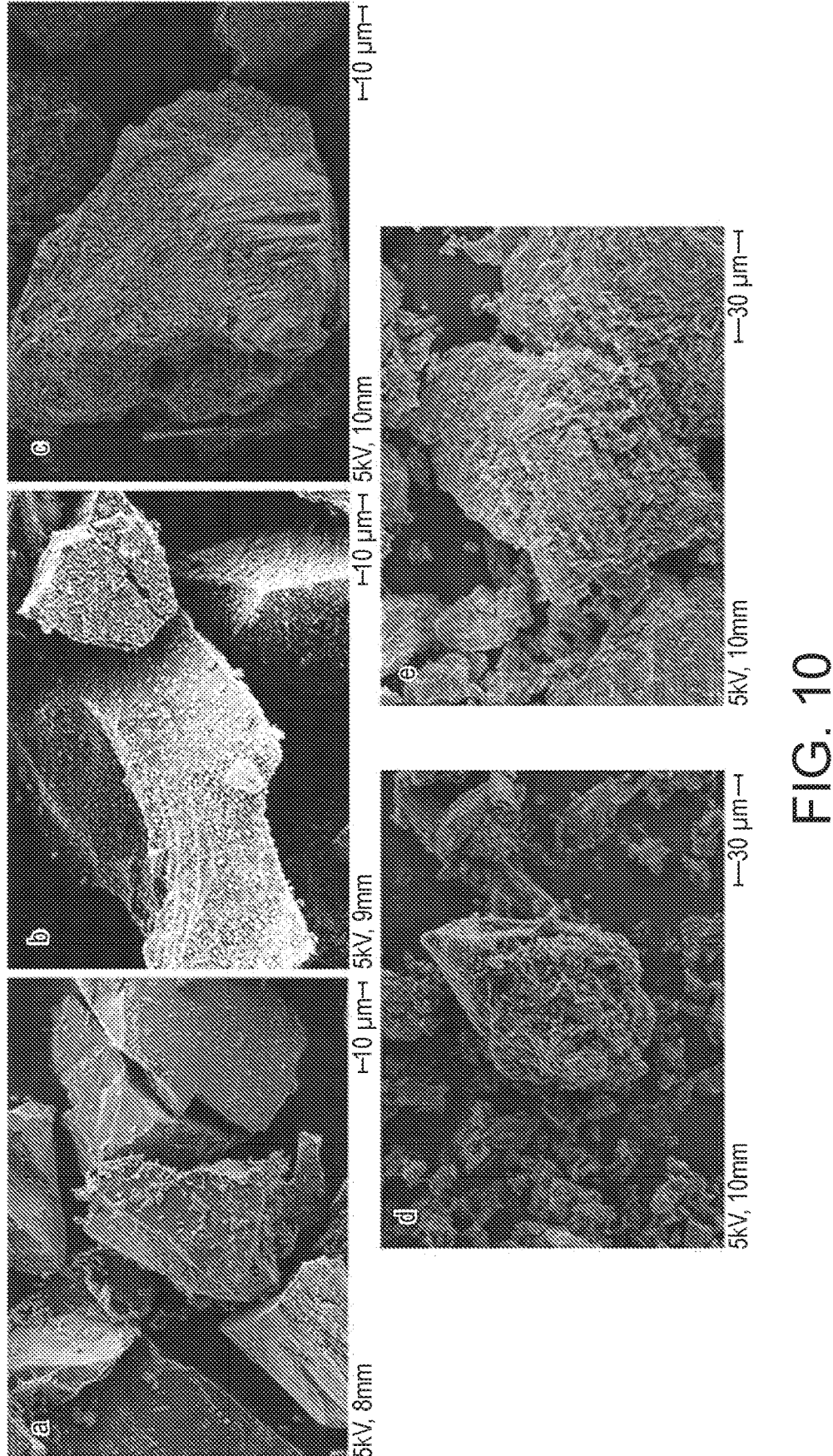
FIG. 10 shows the SEM images of prepared catalysts: (a) Fe/SiC catalyst, (d) Ni/SiC catalyst, (c) Fe—Ni/SiC catalyst, (d) Fe/AC catalyst, and (e) $Fe/SiO_2$ catalyst.

FIG. 10 show the SEM images of prepared catalysts (Fe/SiC, Ni/SiC, FeNi/SiC, Fe/AC and Fe/SiO₂). It can be seen that the dispersion of Ni particles on SiC is better than Fe, hence, the particle size of Ni is smaller than Fe particles.

Regarding FeNi/SiC catalysts, the addition of Ni improves the dispersion of metal particles on the SiC surface, which leads to a decrease of the metal particle size. The images of Fe/AC and Fe/SiO₂ show that the particle size of AC and SiO₂ is larger than SiC. Hence, the SiC has a smooth surface which is different to the porous structure of AC and SiO₂.

Figure 11:
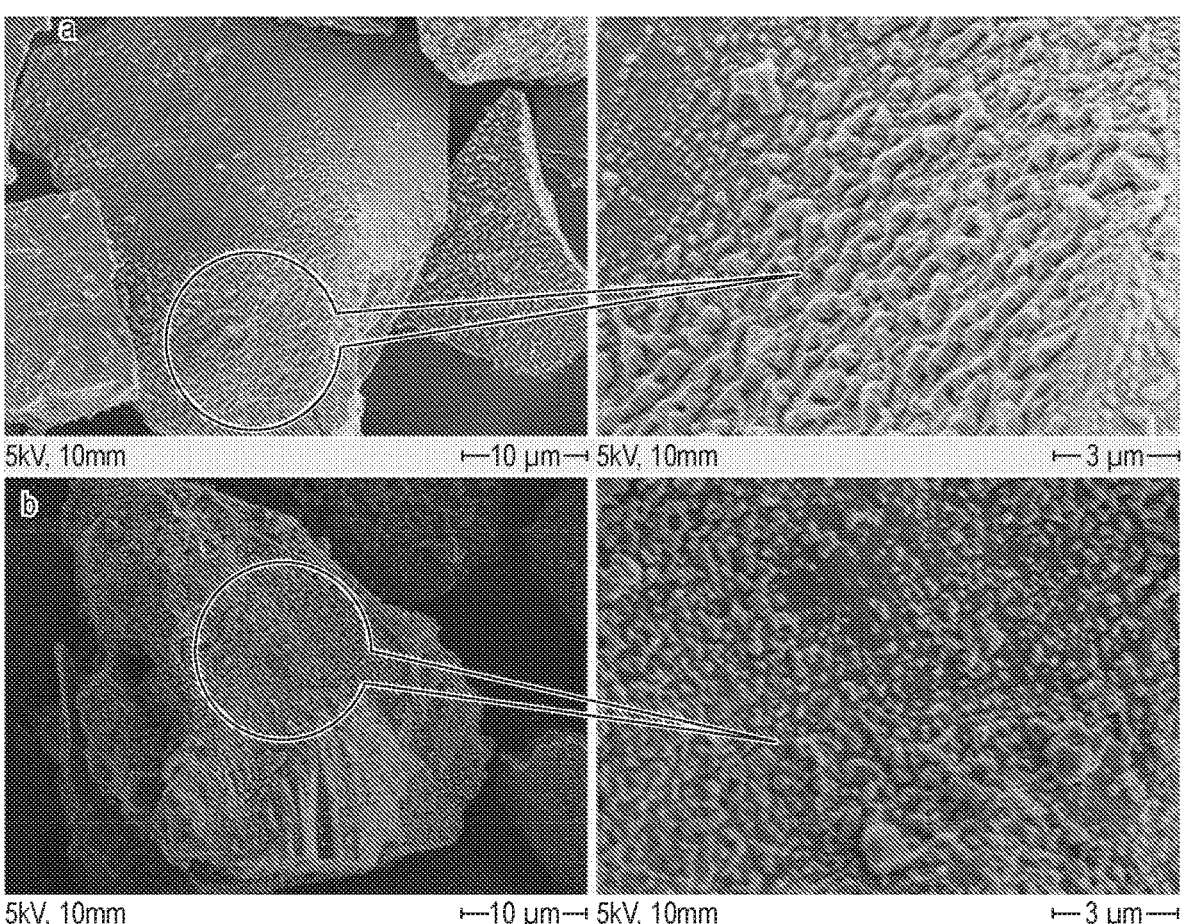
FIG. 11 shows the SEM images of (a) Fe—Ni/SiC (5,1) catalyst, (d) Fe—Ni/SiC (5, 5) catalyst. Figures in parenthesis indicate weight percentage of metal content in the catalyst.
Figure 12:
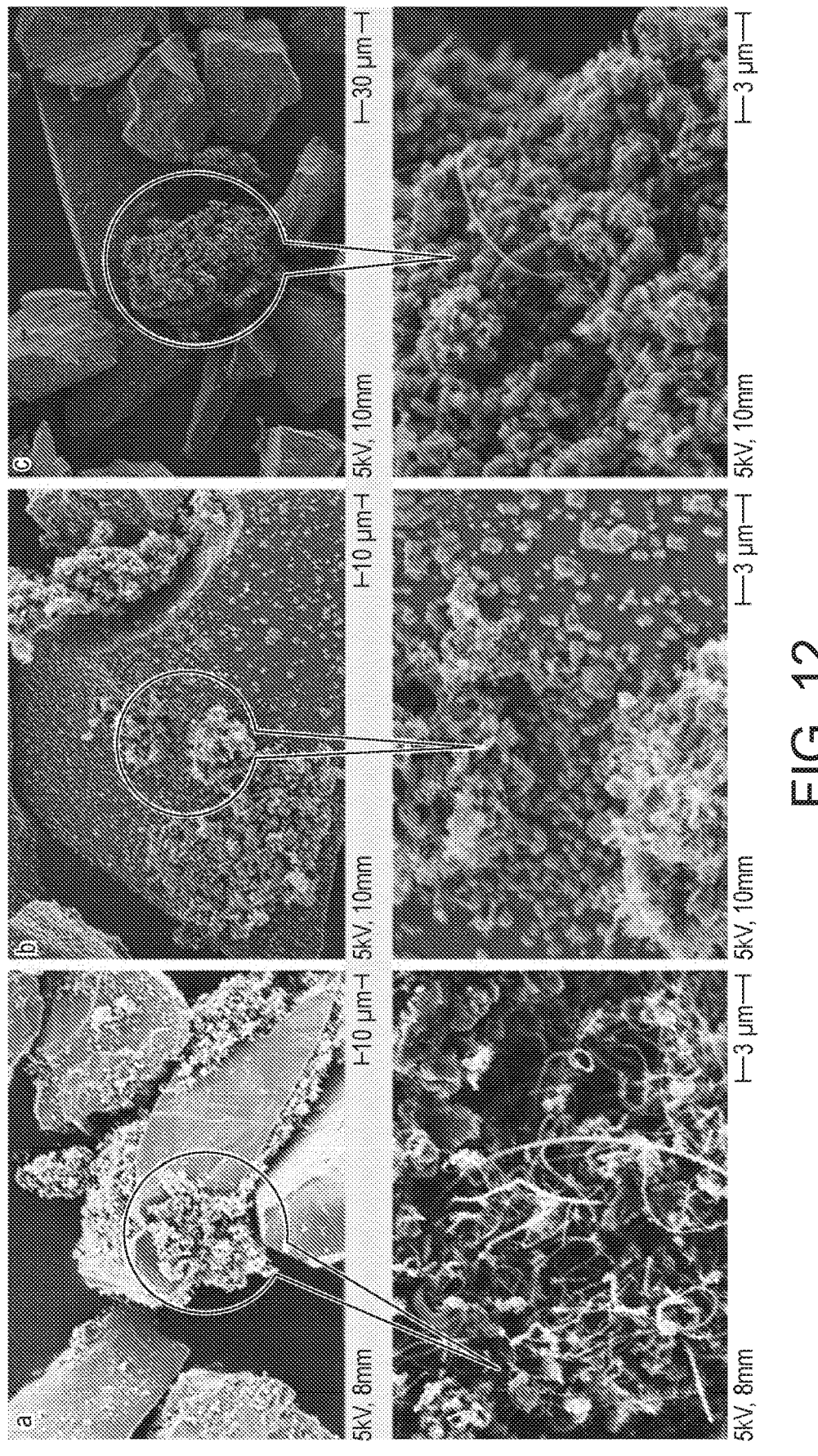
FIG. 12 shows the SEM images of the spent catalysts. (a) Fe/SiC catalyst, (b) Ni/SiC catalyst, and (c) Fe—Ni/SiC catalyst.

The effect of the nickel which can improve the dispersion of metal on the SiC surface can be seen in FeNi/SiC catalysts (FIG. 11). The FeNi/SiC catalysts with more Ni contain has better dispersion and smaller metal particle size. This can be seen at FeNi/SiC (5, 5) catalysts which have 5 wt % of Fe and Ni respectively loaded on SiC. The metal particles were nearly uniformly distributed on the SiC surface. The spent catalyst was shown in FIG. 12.

The characterisation of Fe—Ni/SiC catalyst before and after microwave treatment by both Scanning Electron Microscopy (SEM) and X-ray diffraction (XRD) clearly highlight the effect of the nickel. The presence of nickel in SiC supported iron catalysts improves the dispersion of metal particles on SiC surface.

VII. Laser-Raman Spectroscopy

Figure 13:
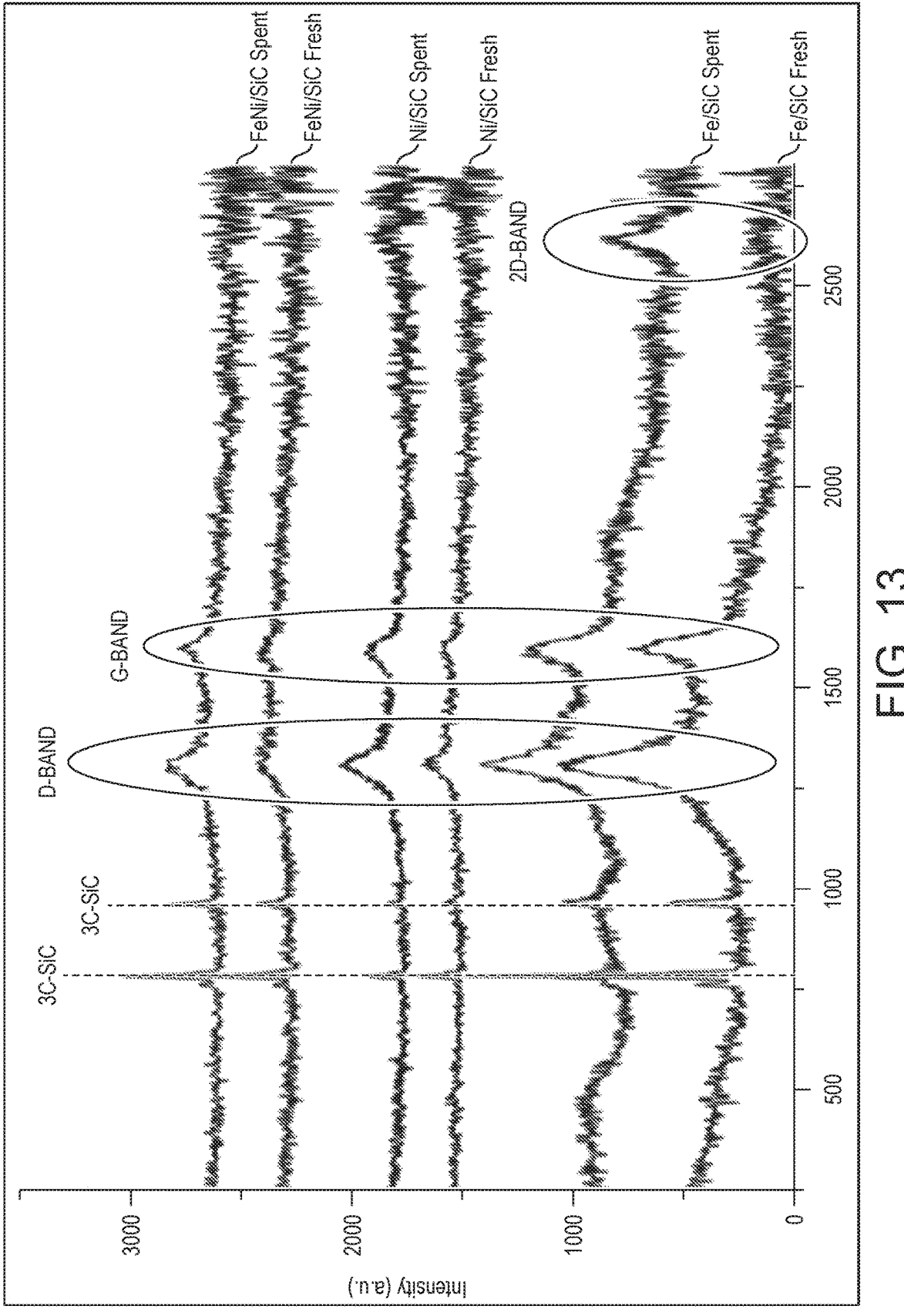
FIG. 13 shows the Raman spectrum of fresh and spent catalysts.

Laser-Raman spectroscopy was used in order to test the carbon in spent catalysts. The Raman Spectrum was shown in FIG. 13 demonstrates the carbon content in spent catalysts. The peaks at around $1350 \text{ cm}^{-1}$, $1580 \text{ cm}^{-1}$, and $2690 \text{ cm}^{-1}$ indicate the D-Band, G-Band, and 2D-Band of carbon, respectively.

Re-Usability of the Catalyst

A time course study was conducted looking at gas evolution when diesel was introduced to various catalysts under microwave irradiation.

Gas evolution was monitored from the onset of microwave irradiation by GC. Every 30 minutes a fresh aliquot of diesel (0.5 ml) was added and the catalyst was regenerated by calcination at 550° C. for 1 h.

Figure 14:
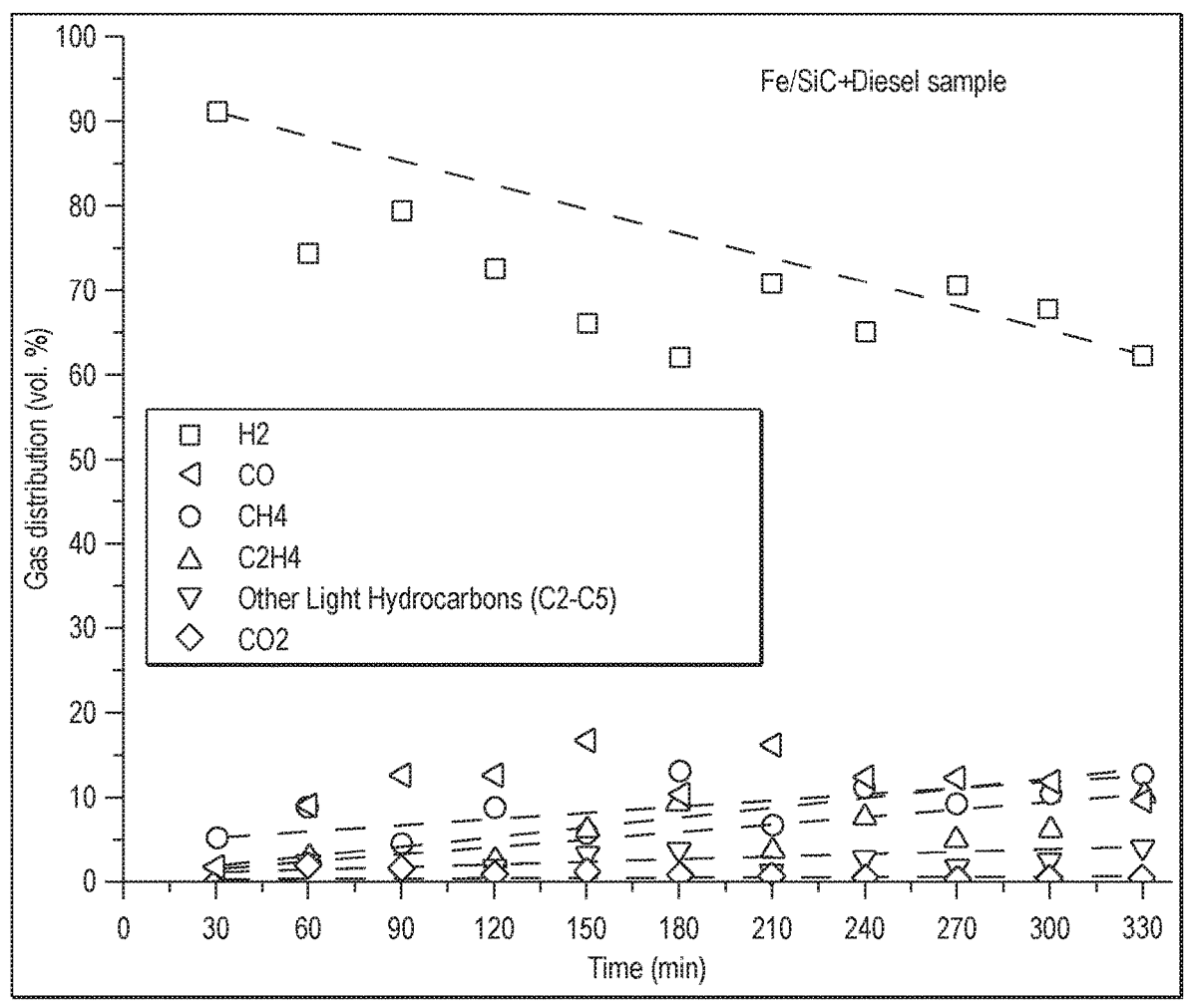
FIG. 14 shows a time course analysis of gas evolution when diesel is treated with 5% wt. Fe/SiC under microwave irradiation.

For a 5 wt. % Fe/SiC catalyst the evolved gas distribution (vol. %) was similar to that obtained from pure liquid alkanes (ca. 91 vol. %) (See FIG. 14). The evolved gas distribution was stable after 150 minutes at which point the hydrogen concentration fluctuated from ca. 65-75 vol. %.

More CO was found, presumably due to the presence of iron oxide, the concentration of $H_2$ and CO being ca. 85 vol. %. Importantly, the $CO_2$ concentration kept less than 1 vol. % during whole period of microwave treatment.

Conclusion

Figure 15:
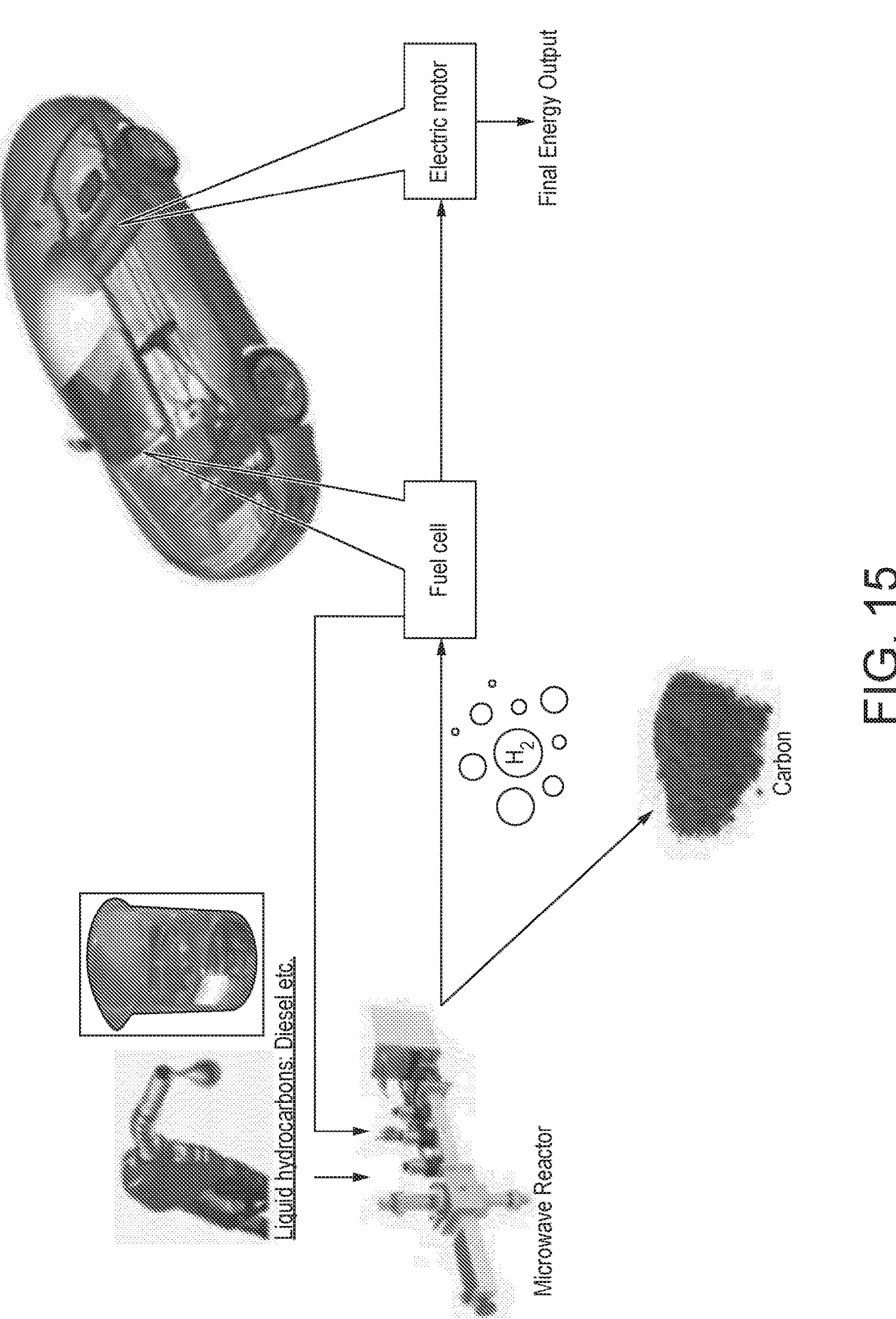
FIG. 15 shows how the process can be incorporated on-board hydrogen powered vehicles.

The described invention provides a new process which combines the microwave-assisted processing of liquid compositions comprising hydrocarbons over solid catalysts for hydrogen production. Not only could this process be accommodated on vehicles for in situ hydrogen production (see FIG. 15), but using liquid compositions comprising hydrocarbons as hydrogen storage materials is sufficient to meet the on board 7 wt. % hydrogen target set by the US Department of Energy. The high $H_2$, low $CO_2$ process could subsequently alleviate concerns of greenhouse gas emission on vehicles.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law).

All headings and sub-headings are used herein for convenience only and should not be construed as limiting the invention in any way.

The use of any and all examples, or exemplary language (e.g., "such as") provided herein, is intended merely to better illuminate the invention and does not pose a limitation on the scope of the invention unless otherwise paragraphed. No language in the specification should be construed as indicating any non-paragraphed element as essential to the practice of the invention.

The citation and incorporation of patent documents herein is done for convenience only and does not reflect any view of the validity, patentability, and/or enforceability of such patent documents.

This invention includes all modifications and equivalents of the subject matter recited in the paragraphs appended hereto as permitted by applicable law.

REFERENCES

1. P. P. Edwards, V. L. Kuznetsov, W. I. F. David, N. P. Brandon, Hydrogen and fuel cells: Towards a sustainable energy future. *Energy Policy* 36, 4356-4362 (2008).
2. D. P. Gregory, D. Y. C. Ng, G. M. Long, The hydrogen economy. *Electrochem. Cleaner Environ.*, 226-280 (1972).
3. J. A. Turner, Sustainable Hydrogen Production. *Science (Washington, DC, U. S.)* 305, 972-974 (2004).
4. M. Ni, M. K. H. Leung, D. Y. C. Leung, K. Sumathy, A review and recent developments in photocatalytic water-splitting using for hydrogen production. *Renewable and Sustainable Energy Reviews* 11, 401-425 (2007).
5. J. Turner et al., Renewable hydrogen production. *Int. J. Energy Res.* 32, 379-407 (2008).
6. L. Schlapbach, A. Zuettel, Hydrogen-storage materials for mobile applications. *Nature (London, U. K.)* 414, 353-358 (2001).
7. M. L. Wald, Questions about a hydrogen economy. *Sci. Am.* 290, 66-73 (2004).
8. B. Sakintuna, F. Lamari-Darkrim, M. Hirscher, Metal hydride materials for solid hydrogen storage: A review. *International Journal of Hydrogen Energy* 32, 1121-1140 (2007).
9. Z. Xiong et al., High-capacity hydrogen storage in lithium and sodium amidoboranes. *Nat Mater* 7, 138-141 (2008).
10. W. Grochala, P. P. Edwards, Thermal Decomposition of the Non-Interstitial Hydrides for the Storage and Production of Hydrogen. *Chem. Rev. (Washington, DC, U. S.)* 104, 1283-1315 (2004).
11. F. A. Armstrong, J. C. Fontecilla-Camps, A Natural Choice for Activating Hydrogen. *Science (Washington, DC, U. S.)* 322, 529 (2008).
12. A. Boddien et al., Efficient Dehydrogenation of Formic Acid Using an Iron Catalyst. *Science (Washington, DC, U. S.)* 333, 1733-1736 (2011).
13. M. Wang, L. Sun, Hydrogen Production by Noble-Metal-Free Molecular Catalysts and Related Nanomaterials. *ChemSusChem* 3, 551-554 (2010).
14. R. M. Navarro, M. A. Pena, J. L. G. Fierro, Hydrogen Production Reactions from Carbon Feedstocks: Fossil Fuels and Biomass. *Chem. Rev. (Washington, DC, U. S.)* 107, 3952-3991 (2007).
15. R. J. Pearson et al., Energy storage via carbon-neutral fuels made from CO2, water, and renewable energy. *Proc. IEEE* 100, 440-460 (2012).
16. Gonzalez-Cortes, S. et al. Wax: A benign hydrogen-storage material that rapidly releases H2-rich gases through microwave-assisted catalytic decomposition. Sci. Rep. 6, 35315; doi: 10.1038/srep35315 (2016)

The invention claimed is:

1. A process for producing a gas comprising hydrogen, comprising exposing a liquid composition comprising a hydrocarbon to microwave radiation in the presence of a solid catalyst, wherein the catalyst comprises:

a binary mixture of elemental metals selected from elemental Fe and elemental Ni (Fe/Ni), elemental Fe and elemental cobalt (Fe/Co), elemental Fe and elemental Ru (Fe/Ru), elemental Fe and elemental Cu (Fe/Cu), elemental Ni and elemental Co (Ni/Co), elemental Ni and elemental Ru (Ni/Ru); or elemental Ni and elemental Cu (Ni/Cu); and a non-oxygenated ceramic;

wherein the gas produced comprises about 1 vol. % or less of carbon monoxide and about 1 vol. % or less of carbon dioxide in the total amount of evolved gas; and wherein the liquid composition comprises at least 75 wt. % of $C_9$ to $C_{20}$ hydrocarbons and is substantially free of water.

2. A process according to claim 1, wherein the binary mixture of elemental metals is selected from elemental Fe and elemental Ni (Fe/Ni).

3. A process according to claim 1, wherein the ratio the elemental metals is from about 10:1 to about 1:10.

4. A process according to claim 1, wherein the catalyst has a metal species loading of from about 2 wt. % to about 5 wt. %.

5. A process according to claim 1, wherein the non-oxygenated ceramic is a carbide or a nitride.

6. A process according to claim 5, wherein the non-oxygenated ceramic is selected from silicon carbide, boron carbide, tungsten carbide, zirconium carbide and aluminium carbide.

7. A process according to claim 6, wherein the non-oxygenated ceramic is selected from silicon carbide and silicon nitride.

8. A process according to claim 1, wherein the catalyst essentially consists of elemental Fe and elemental Ni supported on silicon carbide.

9. A process according to claim 1, wherein the liquid composition essentially consists of non-oxygenated petro-diesel or commercial petro-diesel.

10. A process according to claim 1, wherein a binary mixture of elemental metals selected from elemental Fe and elemental Ni (Fe/Ni) or elemental Fe and elemental cobalt (Fe/Co).

11. A process according to claim 1, wherein the binary mixture of elemental metals is selected from elemental Fe and elemental Co (Fe/Co).

12. A process according to claim 1, wherein the catalyst essentially consists of elemental Fe and elemental Co supported on silicon carbide.

13. A process according to claim 1, wherein the ratio the elemental metals is about 1:1.

14. A process according to claim 1, wherein the catalyst has a metal species loading of about 5 wt. %.

* * * * *